(12) United States Patent
Wada

(10) Patent No.: US 7,580,202 B2
(45) Date of Patent: Aug. 25, 2009

(54) ZOOM LENS SYSTEM AND IMAGE PICKUP APPARATUS INCLUDING THE SAME

(75) Inventor: Ken Wada, Shioya-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/189,275

(22) Filed: Aug. 11, 2008

(65) Prior Publication Data

US 2009/0059387 A1 Mar. 5, 2009

(30) Foreign Application Priority Data

Sep. 5, 2007 (JP) .............................. 2007-230011

(51) Int. Cl.
*G02B 15/14* (2006.01)
(52) U.S. Cl. ................... 359/689; 359/686; 359/690
(58) Field of Classification Search ................. 359/676, 359/686–690; 369/72–88; 348/240.99–240.3, 348/335–369
See application file for complete search history.

(56) References Cited

U.S. PATENT DOCUMENTS

| 6,606,200 | B1 | 8/2003 | Nakayama |
| 6,704,149 | B2 | 3/2004 | Ohmori |
| 7,206,139 | B2 | 4/2007 | Bito |
| 7,304,805 | B2 | 12/2007 | Endo |

*Primary Examiner*—Darryl J Collins
(74) *Attorney, Agent, or Firm*—Canon USA Inc. IP Div

(57) ABSTRACT

A zoom lens system includes, in order from an object side to an image side, a first lens unit having a positive refractive power, a second lens unit having a negative refractive power, and a subsequent lens-unit set including at least one lens units. Intervals between the lens units change during zooming. The first lens unit includes a negative lens element, an optical element, and a positive lens element. Various parameters are set appropriately, including the Abbe number νn and the partial dispersion ratio θgF of a material composing the optical element, the focal length $f_{1n}$ of the negative lens element and the Abbe number $\nu_{1n}$ of a material composing the negative lens element, the focal length $f_1$ of the first lens unit, and respective lateral magnifications $\beta_{3iw}$ and $\beta_{3it}$ of the subsequent lens-unit set at a wide-angle end and at a telephoto end.

13 Claims, 16 Drawing Sheets

ZOOM LENS SYSTEM AND IMAGE PICKUP APPARATUS INCLUDING THE SAME

BACKGROUND OF THE INVENTION

1. Field of the Invention

The present invention relates to zoom lens systems and image pickup apparatuses including the same, and in particular to zoom lens systems included in image pickup apparatuses such as digital still cameras, video cameras, film cameras, and broadcast cameras.

2. Description of the Related Art

With an increase in the pixel density of solid-state image pickup devices, recent image pickup apparatuses (cameras) such as video cameras and digital still cameras provided with solid-state image pickup devices have high functionality and are of small sizes. Zoom lens systems serving as image taking optical systems to be included in such image pickup apparatuses are desired to be compact with a high zoom ratio.

Examples of a zoom lens system having a high zoom ratio include a positive-lead zoom lens system, in which a first lens unit having a positive refractive power; a second lens unit having a negative refractive power; and a subsequent lens-unit set including at least one lens unit and generally having a positive refractive power are arranged in that order from an object side to an image side.

Widely known examples of a zoom lens system having a compact body and a high zoom ratio include a retractable zoom lens system, in which intervals between lens units are made to be shorter during periods when an image taking operation is not being performed than during periods when an image taking operation is being performed.

In general, the more lens elements each of the lens units in a zoom lens system has, the larger the length of each of the lens units along the optical axis becomes. This makes it difficult to reduce the retracted length of the zoom lens system. To make such a zoom lens system storable in a compact size, the thickness of each of the lens units in a retracted state should be reduced. In this sense, it is effective to reduce the number of lens elements included in the first lens unit, which tends to have a large effective diameter.

Exemplary positive-lead zoom lens systems are disclosed in U.S. Pat. Nos. 7,206,139, 6,704,149, and 6,606,200, in each of which a first lens unit includes only a negative lens element and a positive lens element. Another exemplary positive-lead zoom lens system is disclosed in U.S. Pat. No. 7,304,805, in which lens elements included in a first lens unit are composed of an anomalous dispersion material, whereby chromatic aberration is corrected well.

In general, the total size of a zoom lens system can be reduced by reducing the number of lens elements included in each of the lens units of the zoom lens system while increasing the refractive power of each of the lens units.

However, lens elements of a zoom lens system configured in such a manner tend to become thick because of the increase of refractive powers in the respective lens surfaces. Therefore, the length of the entire zoom lens system may not be reduced sufficiently and correction of various aberrations may become difficult.

In particular, if the number of lens elements included in each of the lens units is reduced, it may become difficult to correct aberrations, such as spherical aberration and coma, related to monochrome imaging performance.

Moreover, since the type of materials that can be used for making lens elements is limited, it is difficult to correct chromatic aberration. Usually, goals of size reduction of a zoom lens system and improvement of image quality are incompatible with each other and therefore it is not easy to realize both of the goals simultaneously.

In the positive-lead zoom lens system disclosed in U.S. Pat. No. 7,206,139, the first lens unit includes lens elements composed of glass materials having high refractive indices so that both the number of lens elements and the amount of aberration occurring in the positive lens element included in the first lens unit can be reduced.

However, if materials having high refractive indices are used for the lens elements of the first lens unit, the amount of chromatic aberration may become large in a zoom range near the telephoto end as the zoom ratio is increased. Such chromatic aberration cannot be corrected well easily.

The zoom lens systems disclosed in U.S. Pat. Nos. 6,704,149 and 6,606,200 each have a high zoom ratio that is realized by satisfactory correction of chromatic aberration using a diffractive optical element provided in the first lens unit. In general, however, it is difficult to manufacture diffractive optical elements.

The zoom lens system disclosed in U.S. Pat. No. 7,304,805 realizes high performance by satisfactory correction of chromatic aberration using an optical element composed of an anomalous dispersion material. The first lens unit of the zoom lens system in U.S. Pat. No. 7,304,805 includes a negative lens element, the aforementioned optical element, a positive lens element, and another positive lens element. Since the first lens unit includes three lens elements, the length of the zoom lens system when retracted so as to be stored tends to be large.

To realize satisfactory optical performance of a positive-lead zoom lens system while increasing the zoom ratio and reducing the entire size (in particular, the retracted size), it is important to appropriately design the first lens unit, which moves during zooming.

If the configuration of the first lens unit is inappropriate, it is very difficult to realize high optical performance throughout the zoom range while maintaining compactness and a high zoom ratio.

SUMMARY OF THE INVENTION

According to an aspect of the present invention, a zoom lens system includes (in order from an object side to an image side) a first lens unit having a positive refractive power, a second lens unit having a negative refractive power, and a subsequent lens-unit set including at least one lens unit. Intervals between the first lens unit, the second lens unit, and the lens units included in the subsequent lens-unit set change during zooming. The first lens unit includes a negative lens element, an optical element, and a positive lens element. In this zoom lens system, the following conditional expressions are satisfied:

$$0.755 < \theta gF - (-1.665 \times 10^{-7} \cdot vn^3 + 5.213 \times 10^{-5} \cdot vn^2 - 5.656 \times 10^{-3} \cdot vn) < 1.011$$

$$0.023 < |f_1/(f_{1n} \cdot v_{1n})| < 0.050$$

$$3.2 < \beta_{3it}/\beta_{3iw} < 6.0$$

where $vn$ and $\theta gF$ denote an Abbe number and a partial dispersion ratio, respectively, of a material composing the optical element; $f_{1n}$ and $v_{1n}$ denote a focal length of the negative lens element and an Abbe number of a material composing the negative lens element, respectively; $f_1$ denotes a focal length of the first lens unit; and $\beta_{3iw}$ and $\beta_{3it}$ denote lateral magnifications of the subsequent lens-unit set at a wide-angle end and at a telephoto end, respectively.

According to this and other aspects of the present invention, a zoom lens system having a short total retracted length and being capable of realizing satisfactory optical performance by satisfactory correction of chromatic aberration and an image pickup apparatus including such a zoom lens system can be provided.

Further features and aspects of the present invention will become apparent from the following description of exemplary embodiments with reference to the attached drawings.

DESCRIPTION OF THE EMBODIMENTS

Figure 1:
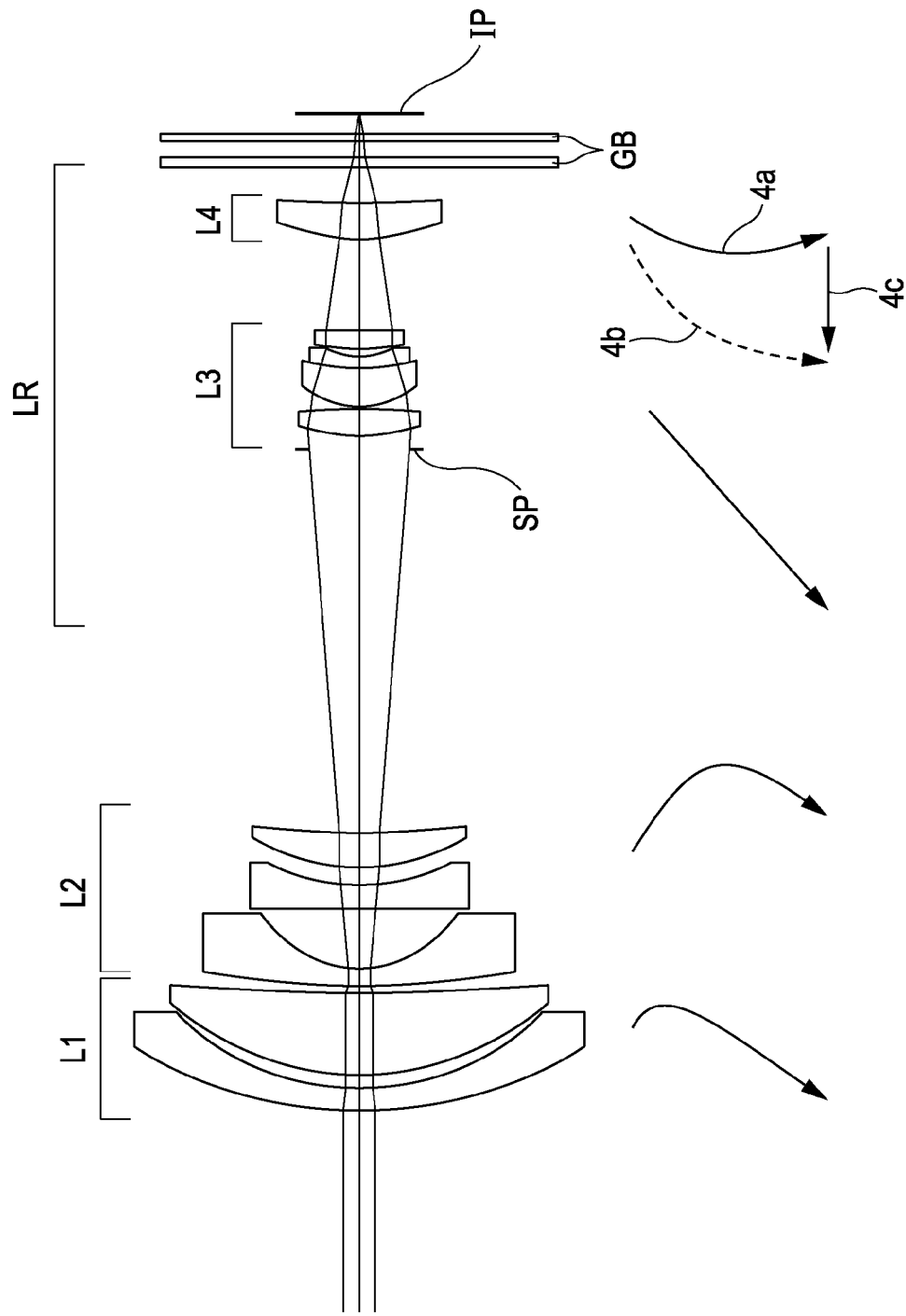
FIG. 1 is a sectional view of an example zoom lens system according to a first exemplary embodiment of the present invention.

A zoom lens system according to the exemplary embodiments of the present invention may include, in order from an object side to an image side, a first lens unit having a positive refractive power, a second lens unit having a negative refractive power, and a set of subsequent lens units (hereinafter referred to as a subsequent lens-unit set). Intervals between the lens units, including those in the subsequent lens-unit set, change during zooming.

The zoom lens systems according to the first to fifth exemplary embodiments are image taking lens systems included in image pickup apparatuses such as video cameras, digital still cameras, and silver-halide-film cameras.

In the sectional view of each zoom lens system, an object resides on the left (front) side, and an image is formed on the right (rear) side.

Further, in the sectional view, when the order of a lens unit counted from the object side is denoted as i, the i-th lens unit is denoted as Li. The subsequent lens-unit set is denoted as LR. Further, an aperture stop is denoted as SP, and an optical block, such as an optical filter; a face plate; a quartz low-pass filter; or an infrared-cut filter, is denoted as GB.

An image plane denoted as IP is an equivalent of the image pickup surface of a solid-state image pickup device (photoelectric conversion element) such as a charge-coupled-device (CCD) sensor or a complementary-metal-oxide-semiconductor (CMOS) sensor when the zoom lens system is used as an image taking optical system of a video camera or a digital still camera, or the film surface when the zoom lens system is used as an image taking optical system in a silver-halide-film camera.

Arrows in each sectional view show loci along which the respective lens units move during zooming from the wide-angle end to the telephoto end and during focusing.

In each aberration diagram, d and g denote the d-line and the g-line, respectively, and $\Delta M$ and $\Delta S$ denote the meridional image plane and the sagittal image plane, respectively. The lateral chromatic aberration is shown for the g-line. Further, $\omega$ denotes the half angle of view, and F denotes the f-number.

In each of the first to fifth exemplary embodiments described below, the wide-angle end and the telephoto end are zoom positions at extreme ends of a range in which magnification-changing lens units can mechanically move along the optical axis.

The zoom lens systems according to the first to fifth exemplary embodiments each include, in order from an object side to an image side, a first lens unit L1 having a positive refractive power, a second lens unit L2 having a negative refractive power, and a subsequent lens-unit set LR.

The subsequent lens-unit set LR includes at least one lens unit and generally has a positive refractive power.

Intervals between the lens units change during zooming. The subsequent lens-unit set LR only needs to include at least one lens unit. If the subsequent lens-unit set LR includes only a single lens unit, it is understood that the zoom lens system includes three lens units in total. Exemplary configurations of the subsequent lens-unit set LR are provided below.

In one case, the subsequent lens-unit set LR includes, in order from the object side to the image side, a third lens unit having a positive refractive power and a fourth lens unit having a positive refractive power.

In another case, the subsequent lens-unit set LR includes, in order from the object side to the image side, a third lens unit having a positive refractive power, a fourth lens unit having a positive refractive power, and a fifth lens unit having a positive refractive power.

In another case, the subsequent lens-unit set LR includes, in order from the object side to the image side, a third lens unit having a negative refractive power, a fourth lens unit having a positive refractive power, and a fifth lens unit having a positive refractive power.

In another case, the subsequent lens-unit set LR includes, in order from the object side to the image side, a third lens unit having a positive refractive power, a fourth lens unit having a negative refractive power, and a fifth lens unit having a positive refractive power.

Other than the cases described above, the subsequent lens-unit set LR may include any number, at least one, of lens units as long as the subsequent lens-unit set LR generally produces a positive refractive power.

In each of the first to fifth exemplary embodiments, the first lens unit L1 includes a negative lens element, an optical element, and a positive lens element.

The Abbe number and partial dispersion ratio of a material composing the optical element in the first lens unit L1 are denoted as νn and θgF, respectively.

The focal length of the negative lens element in the first lens unit L1 and the Abbe number of a material composing that negative lens element are denoted as $f_{1n}$ and $\nu_{1n}$, respectively.

The focal length of the first lens unit L1 is denoted as $f_1$. The lateral magnifications of the subsequent lens-unit set LR at the wide-angle end and at the telephoto end are denoted as $\beta_{3iw}$ and $\beta_{3it}$, respectively.

Here, the following conditions are satisfied:

$$0.755 < \theta gF - (-1.665 \times 10^{-7} \cdot \nu n^3 + 5.213 \times 10^{-5} \cdot \nu n^2 - 5.656 \times 10^{-3} \cdot \nu n) < 1.011 \quad (1)$$

$$0.023 < |f_1/(f_{1n} \cdot \nu_{1n})| < 0.050 \quad (2)$$

$$3.2 < \beta_{3it}/\beta_{3iw} < 6.0 \quad (3)$$

When refractive indices of the material for wavelengths of 436 nm (the g-line), 486 nm (the F-line), 588 nm (the d-line), and 656 nm (the C-line) are denoted as ng, nF, nd, and nC, respectively, the Abbe number νd and the partial dispersion ratio θgF are expressed as follows:

$$\nu d = (nd-1)/(nF-nC)$$

$$\theta gF = (ng-nF)/(nF-nC)$$

Conditional Expression (1) expresses a characteristic of the material composing the optical element. If the lower limit of Conditional Expression (1) is exceeded, the optical element can only have a characteristic less than or equal to that of normal glass. Hence, secondary chromatic aberration particularly at the telephoto end during zooming with a high zoom ratio cannot be corrected sufficiently. In contrast, the upper limit of Conditional Expression (1) is exceeded, chromatic aberration is undesirably over-corrected.

A more desirable range of Conditional Expression (1) is as follows:

$$0.76 < \theta gF - (-1.665 \times 10^{-7} \cdot \nu n^3 + 5.213 \times 10^{-5} \cdot \nu n^2 - 5.656 \times 10^{-3} \cdot \nu n) < 1.011 \quad (1a)$$

Conditional Expression (2) expresses correctability of chromatic aberration occurring in the negative lens element included in the first lens unit L1, i.e., the degree of correction of chromatic aberration required when the optical element is provided in the first lens unit L1.

If the lower limit of Conditional Expression (2) is exceeded, correctability of chromatic aberration in the first lens unit L1 becomes too small. Hence, variation in chromatic aberration occurring during zooming increases.

In contrast, if the upper limit of Conditional Expression (2) is exceeded, correctability of chromatic aberration becomes too large. This undesirably causes over-correction.

Exemplary anomalous dispersion materials for the optical element include a high dispersion material such as ultraviolet curable resin as disclosed in U.S. Pat. No. 7,304,805.

The range of Conditional Expression (2) can more desirably be set as Conditional Expression (2a) provided below, whereby color blurring can be further reduced.

$$0.023 < |f_1/(f_{1n} \cdot \nu_{1n})| < 0.040 \quad (2a)$$

Conditional Expression (3) specifies the magnification ratio of the subsequent lens-unit set LR in the zoom lens system. If the lower limit of Conditional Expression (3) is exceeded, the first and second lens units L1 and L2, which are disposed near the object side, need to be responsible for increased proportions of the magnification-changing operation. Hence, variation in aberrations occurring during zooming because of the configuration of the first lens unit L1 increases.

In contrast, if the upper limit of Conditional Expression (3) is exceeded, the subsequent lens-unit set LR needs to be responsible for too large a proportion of the magnification-changing operation. Hence, variation in spherical aberration and coma, for example, occurring during zooming increases.

The range of Conditional Expression (3) can more desirably be set as Conditional Expression (3a) provided below, whereby variation in aberrations occurring during zooming can be further reduced.

$$3.2 < \beta_{3it}/\beta_{3iw} < 4.5 \quad (3a)$$

By satisfying the conditions provided above, each of the first to fifth exemplary embodiments realizes a zoom lens system of small total size particularly when the zoom lens system is retracted to be stored, while including a small number of lens elements in the first lens unit L1 and maintaining a zoom ratio of 6 to 10.

To realize high optical performance while further increasing the zoom ratio and reducing the total size, it is desirable to satisfy at least one of conditions provided below. Thus, advantageous effects corresponding to the respective conditions can be produced.

The focal length of the optical element included in the first lens unit L1 is denoted as $f_N$, and the focal lengths of the zoom lens system at the wide-angle end and at the telephoto end are denoted as $f_w$ and $f_t$, respectively.

The refractive index of a material composing the positive lens element included in the first lens unit L1 is denoted as $N_{1p}$.

The focal lengths of the subsequent lens-unit set LR at the wide-angle end and at the telephoto end are denoted as $f_{3iw}$ and $f_{3it}$, respectively.

The focal length of the first lens unit L1 is denoted as $f_1$, and the focal length of the negative lens element included in the first lens unit L1 is denoted as $f_{1n}$.

The radii of curvature of an object-side surface and an image-side surface of the negative lens element included in the first lens unit L1 are denoted as $r_1$ and $r_2$, respectively.

The thickness of the optical element along the optical axis is denoted as t, and the length from the first lens surface to the final lens surface in the first lens unit L1 is denoted as L.

Further, the following is provided:

$$f_{3i} = \sqrt{(f_{3iw} \cdot f_{3it})}$$

Here, at least one of the following conditions is desirably satisfied:

$$0.01 < \sqrt{(f_w \cdot f_t)}/f_N < 0.12 \quad (4)$$

$$1.65 < N_{1p} < 1.90 \quad (5)$$

$$0.6 < \sqrt{(f_w \cdot f_t)}/f_{3i} < 2.0 \quad (6)$$

$$0.5 < |f_1/f_{1n}| < 1.0 \quad (7)$$

$$-1 < (r_1 + r_2)/(r_1 - r_2) < 7 \quad (8)$$

$$0.01 < t/L < 0.20 \quad (9)$$

Conditional Expression (4) expresses the focal length of the optical element. If the lower limit of Conditional Expression (4) is exceeded, the refractive power of the optical element becomes too weak. Hence, it becomes difficult to correct secondary chromatic aberration particularly at the telephoto end. In contrast, if the upper limit of Conditional Expression (4) is exceeded, secondary chromatic aberration is undesirably over-corrected.

The range of Conditional Expression (4) can more desirably be set as Conditional Expression (4a) provided below, whereby color blurring (secondary chromatic aberration) can be further reduced.

$$0.01 < \sqrt{(f_w \cdot f_t)}/f_N < 0.10 \quad (4a)$$

Conditional Expression (5) specifies the refractive index of a material composing the positive lens element included in the first lens unit L1.

If the lower limit of Conditional Expression (5) is exceeded, mainly the Petzval sum and the field curvature occurring in the first lens unit L1, for example, become large. In contrast, use of a glass material having a refractive index that exceeds the upper limit of Conditional Expression (5) results in high dispersion rate. Hence, it becomes difficult to correct chromatic aberration.

The range of Conditional Expression (5) can more desirably be set as Conditional Expression (5a) provided below, whereby color blurring can be further reduced.

$$1.65 < N_{1P} < 1.85 \quad (5a)$$

Conditional Expression (6) specifies the average focal length ratio of the subsequent lens-unit set LR. If the lower limit of Conditional Expression (6) is exceeded, the refractive power of the subsequent lens-unit set LR becomes too weak. Hence, it becomes difficult to obtain a desired zoom ratio.

In another case, the first and second lens units L1 and L2, which are disposed near the object side, need to be responsible for increased proportions of the magnification-changing operation. Hence, variation in aberrations occurring during zooming undesirably increases.

In contrast, if the upper limit of Conditional Expression (6) is exceeded, the refractive power becomes too strong. Hence, it becomes difficult to obtain a back focus of a desired length.

The range of Conditional Expression (6) can more desirably be set as Conditional Expression (6a) provided below, whereby variation in aberrations occurring during zooming can be further reduced.

$$0.80 < \sqrt{(f_w \cdot f_t)}/f_{3i} < 1.75 \quad (6a)$$

Conditional Expression (7) expresses the focal length ratio of the negative lens element in the first lens unit L1. If the upper limit or the lower limit of Conditional Expression (7) is exceeded, various aberrations in the first lens unit L1 become over-corrected or under-corrected. Hence, variation in aberrations occurring during zooming increases.

The range of Conditional Expression (7) can more desirably be set as Conditional Expression (7a) provided below:

$$0.55 < |f_1/f_{1n}| < 0.95 \quad (7a)$$

Conditional Expression (8) specifies the shape factor of the negative lens element included in the first lens unit L1. If the lower limit of Conditional Expression (8) is exceeded, field curvature in a zoom range near the wide-angle end undesirably becomes larger toward the under side.

In contrast, if the upper limit of Conditional Expression (8) is exceeded, correctability of various aberrations occurring in the negative lens element is reduced. Hence, variation in aberrations occurring during zooming increases.

The range of Conditional Expression (8) can more desirably be set as Conditional Expression (8a) provided below, whereby field curvature can be corrected much better.

$$-0.7 < (r_1 + r_2)/(r_1 - r_2) < 5 \quad (8a)$$

Conditional Expression (9) specifies the ratio of the center thickness (the thickness along the optical axis) of the optical element included in the first lens unit L1 and the block thickness of the first lens unit L1 (the length from the first lens surface to the final lens surface in the first lens unit L1).

If the lower limit of Conditional Expression (9) is exceeded, the optical element becomes too thin. Hence, it becomes difficult to give the optical element a refractive power. Consequently, correctability of secondary chromatic aberration becomes insufficient. In contrast, if the upper limit of Conditional Expression (9) is exceeded, the optical element becomes too thick. Hence, it becomes difficult to reduce the length of the zoom lens system when retracted to be stored.

The range of Conditional Expression (9) can more desirably be set as Conditional Expression (9a) provided below, whereby the length of the zoom lens system when retracted to be stored can be further reduced. Thus, a compact zoom lens system can be realized.

$$0.01 < t/L < 0.16 \quad (9a)$$

Next, the configuration of the zoom lens system according to each of the first to fifth exemplary embodiments will be described.

First Exemplary Embodiment

Figure 2:
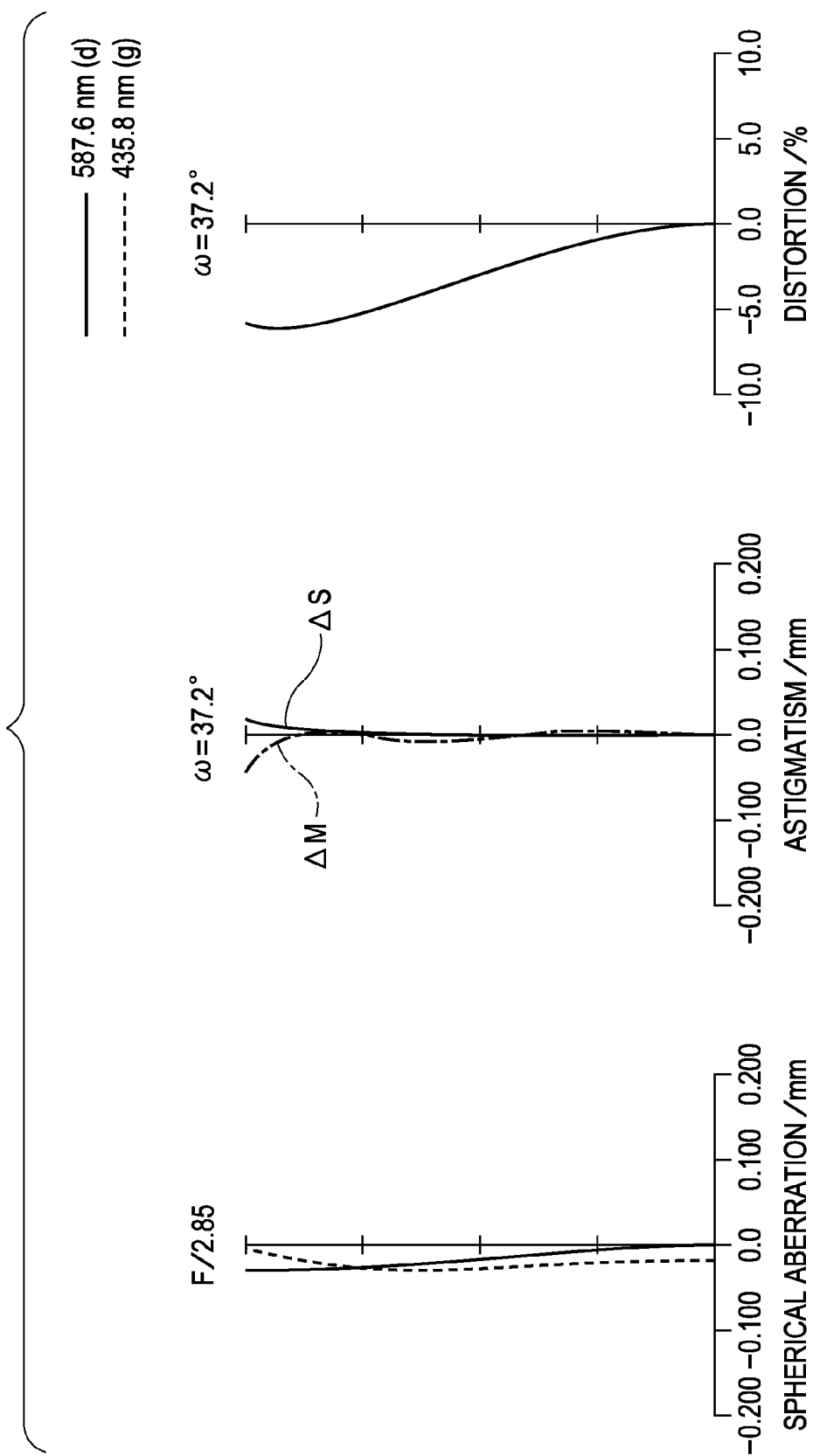
FIG. 2 is a diagram showing aberrations of the zoom lens system according to the first exemplary embodiment at a wide-angle end.
Figure 3:
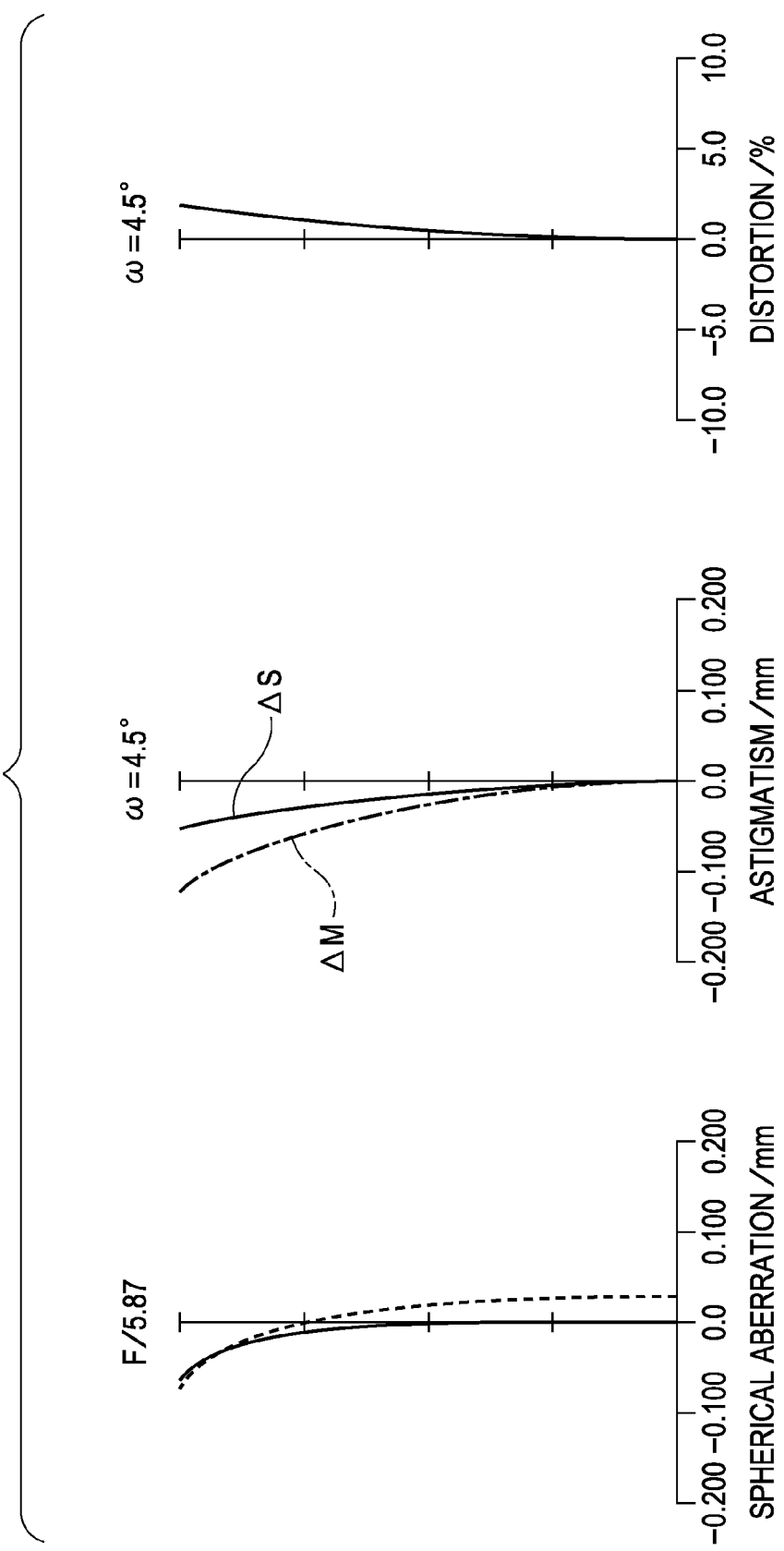
FIG. 3 is a diagram showing aberrations of the zoom lens system according to the first exemplary embodiment at a telephoto end.

FIG. 1 is a sectional view of a zoom lens system according to a first exemplary embodiment at a wide-angle end (short-focal-length end). FIGS. 2 and 3 are diagrams showing aberrations of the zoom lens system according to the first exemplary embodiment at the wide-angle end and at a telephoto end (long-focal-length end), respectively.

The zoom lens system according to the first exemplary embodiment includes, in order from the object side to the image side, a first lens unit L1 having a positive refractive power, a second lens unit L2 having a negative refractive power, a third lens unit L3 having a positive refractive power, and a fourth lens unit L4 having a positive refractive power.

During zooming from the wide-angle end to the telephoto end, the first lens unit L1 moves toward the object side along a locus convex toward the image side.

Alternatively, the first lens unit L1 may monotonically move toward the object side. The second lens unit L2 moves along a locus convex toward the image side. The third lens unit L3 moves toward the object side. The fourth lens unit L4 moves along a locus convex toward the object side. The fourth lens unit L4 is responsible for focusing performed when the image taking distance (distance to the object) changes.

At the telephoto end, to focus on a near object from focusing on an object at infinity, the fourth lens unit L4 is moved forward as indicated by an arrow 4c shown in the corresponding sectional view.

A solid curve 4a and a dotted curve 4b shown for the fourth lens unit L4 are loci along which the fourth lens unit L4 moves to correct variations in the image plane occurring during zooming from the wide-angle end to the telephoto end. The solid curve 4a indicates the case where the focus is on an object at infinity, and the dotted curve 4b indicates the case where the focus is on a near object.

The first lens unit L1 is a cemented lens in which, in order from the object side to the image side, a negative lens element, an optical element, and a positive lens element are cemented together.

Thus, a compact configuration is realized. The positive lens element is made of a material (s-lah66 manufactured by OHARA) having a high refractive index of Nd=1.772 so that aberrations such as coma and field curvature occurring in the positive lens element can be reduced.

In a zoom lens system having a high zoom ratio and whose focal length becomes large in a zoom range near the telephoto end, if a positive lens element of a first lens unit L1 is made of a material having a high refractive index, secondary chromatic aberration increases particularly in a zoom range near the telephoto end.

Therefore, in the first exemplary embodiment, a convex-shaped optical element made of an anomalous dispersion material is made to function between the negative lens element and the positive lens element in the first lens unit L1.

Thus, secondary chromatic aberration is corrected well. The optical elements applied to the first to fifth exemplary embodiments may be made of either glass or resin as long as the characteristic expressed in Conditional Expression (1) is satisfied.

In the first exemplary embodiment, to suppress variation in aberrations such as field curvature occurring during zooming, the proportion of the magnification ratio to be allocated to the subsequent lens-unit set LR is set to a value as large as 3.56. Thus, a zoom lens system having a zoom ratio as high as 10 can be realized.

The zoom type and focusing method of the zoom lens system according to the second exemplary embodiment are the same as in the first exemplary embodiment.

The first lens unit L1 is a cemented lens in which, in order from the object side to the image side, an optical element, a positive lens element, and a negative lens element are cemented together. Thus, a compact configuration is realized.

Second Exemplary Embodiment

Figure 4:
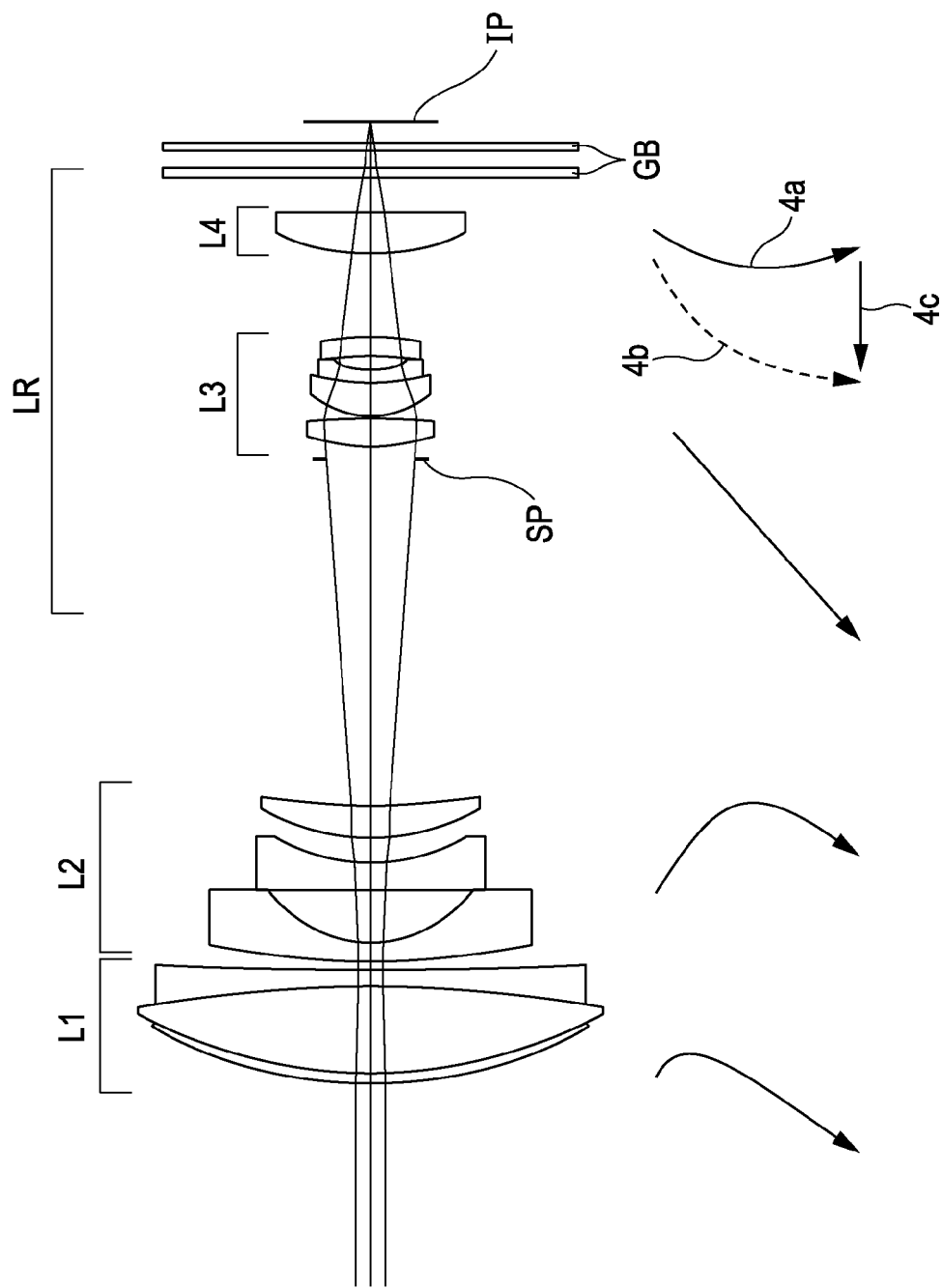
FIG. 4 is a sectional view of an example zoom lens system according to a second exemplary embodiment of the present invention.
Figure 5:
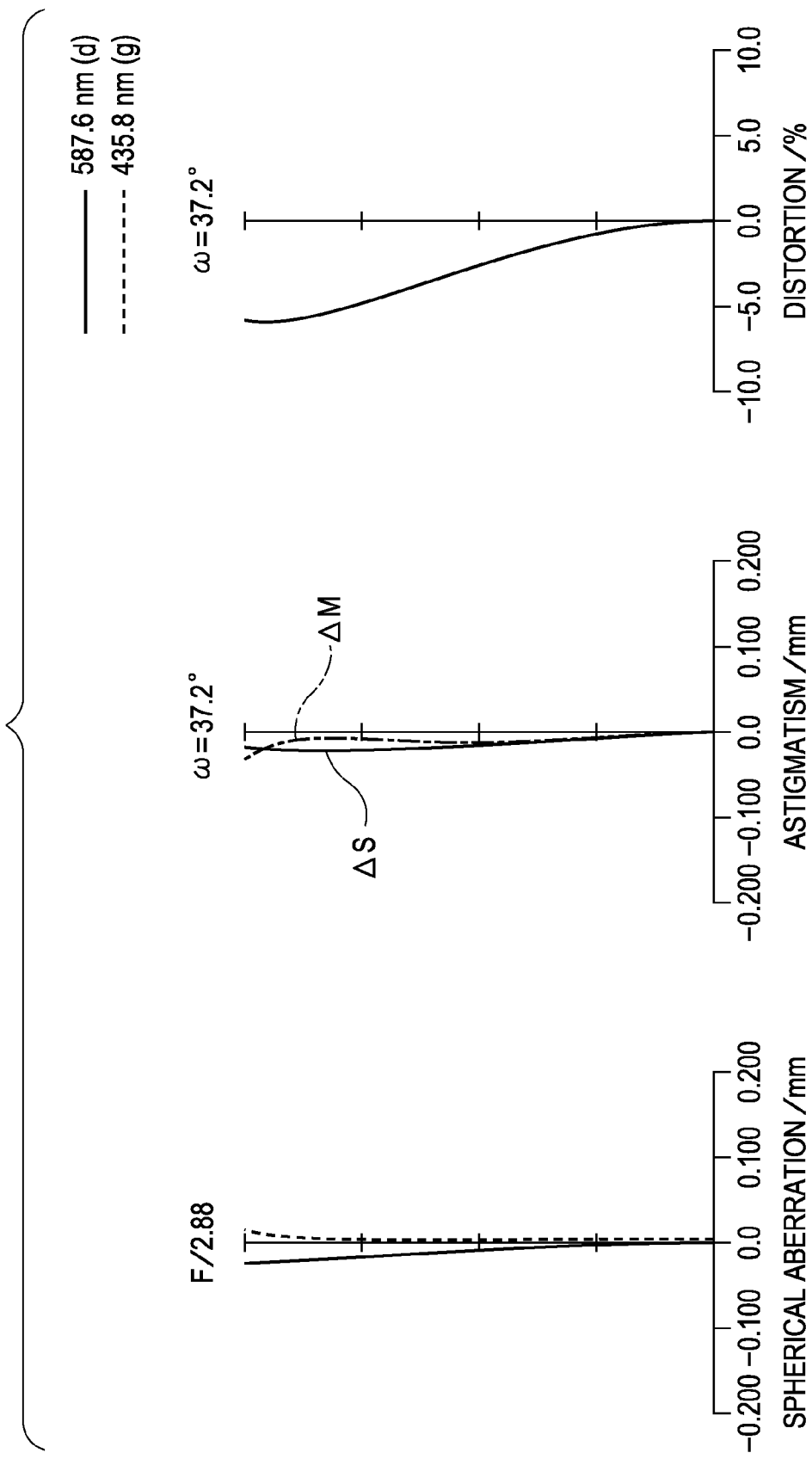
FIG. 5 is a diagram showing aberrations of the zoom lens system according to the second exemplary embodiment at a wide-angle end.
Figure 6:
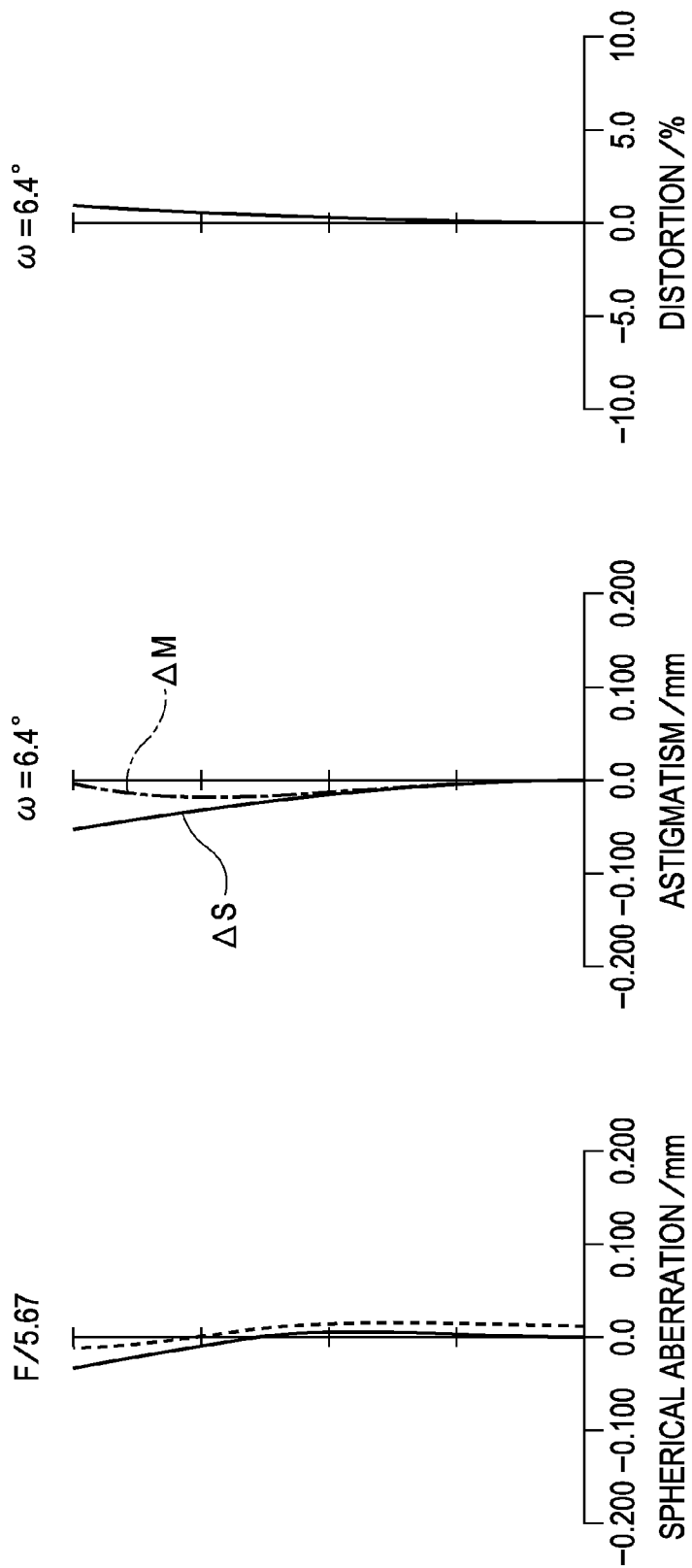
FIG. 6 is a diagram showing aberrations of the zoom lens system according to the second exemplary embodiment at a telephoto end.

FIG. 4 is a sectional view of a zoom lens system according to a second exemplary embodiment at a wide-angle end. FIGS. 5 and 6 are diagrams showing aberrations of the zoom lens system according to the second exemplary embodiment at the wide-angle end and at a telephoto end, respectively.

In the second exemplary embodiment, the object-side surface of the optical element has an aspherical shape, whereby off-axis aberrations such as field curvature are corrected well. In addition, the positive lens element is made of a material (s-lal12 manufactured by OHARA) having a high refractive index of Nd=1.678 so that aberrations such as coma and field curvature occurring in the positive lens element are reduced.

Third Exemplary Embodiment

Figure 7:
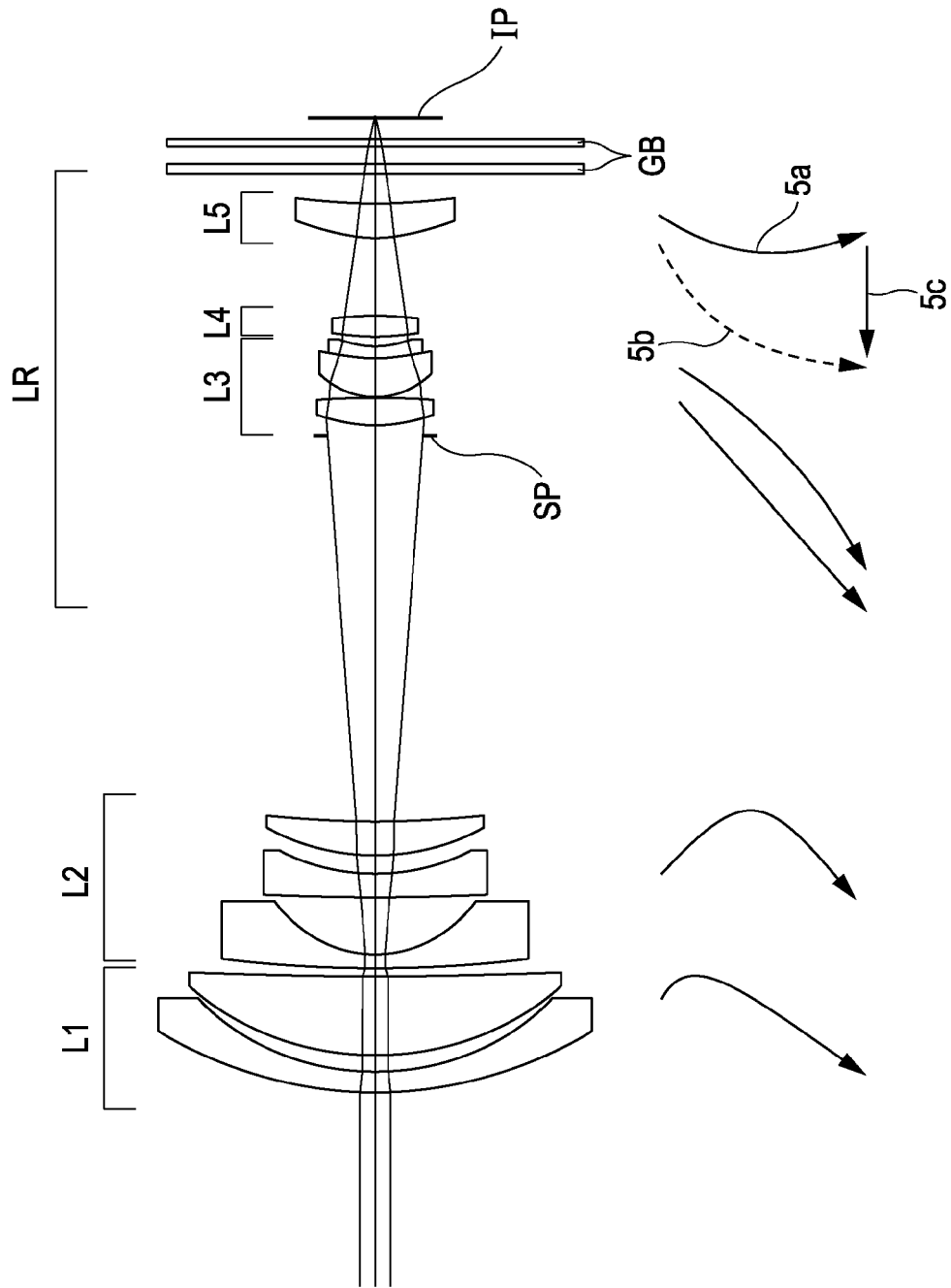
FIG. 7 is a sectional view of an example zoom lens system according to a third exemplary embodiment of the present invention.
Figure 8:
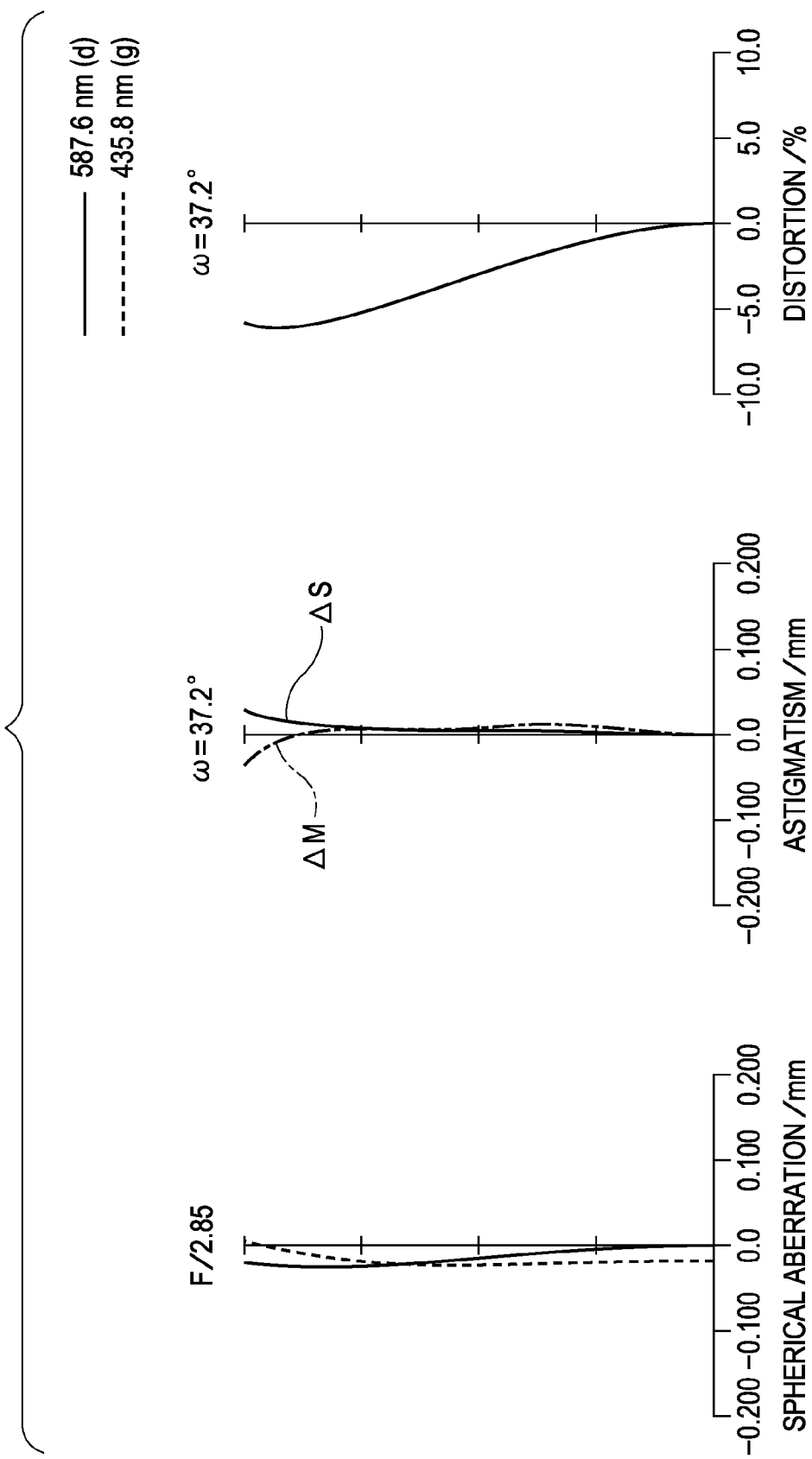
FIG. 8 is a diagram showing aberrations of the zoom lens system according to the third exemplary embodiment at a wide-angle end.
Figure 9:
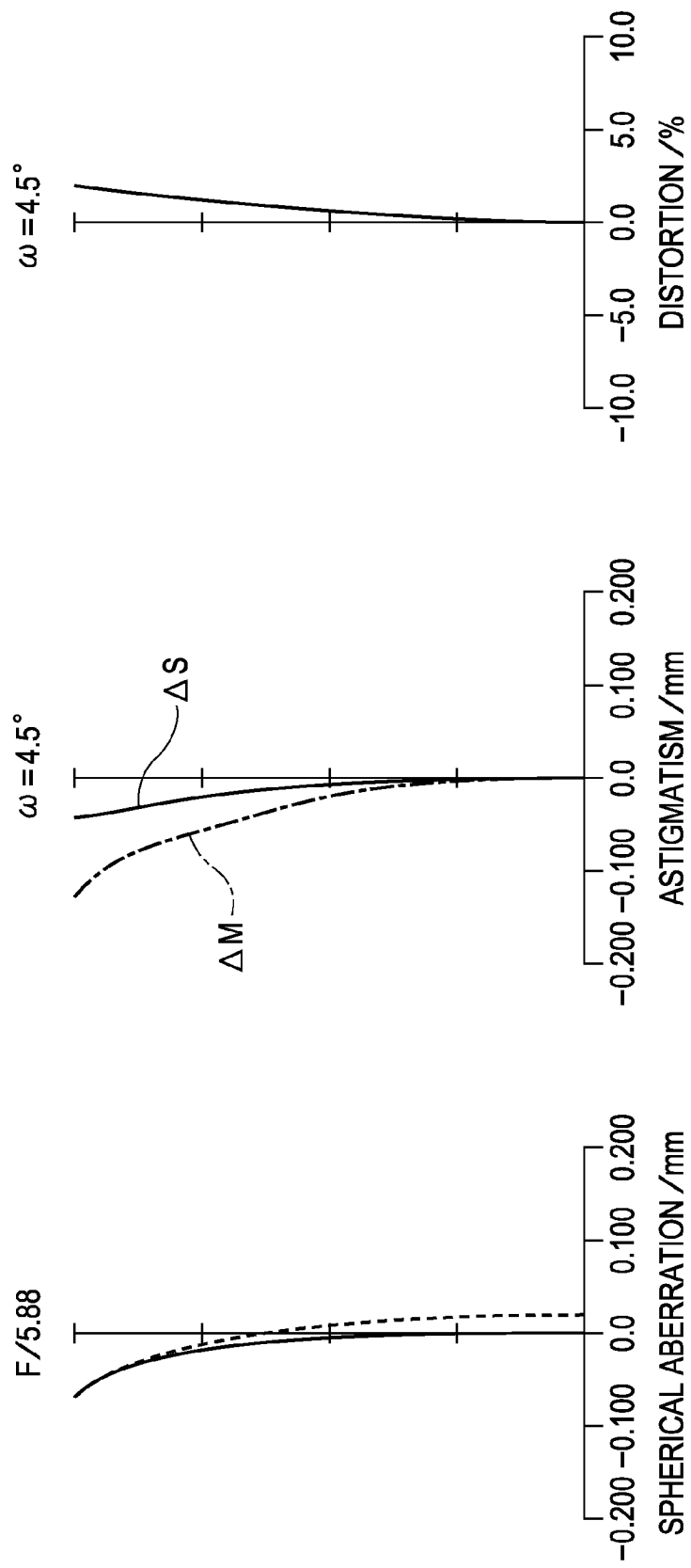
FIG. 9 is a diagram showing aberrations of the zoom lens system according to the third exemplary embodiment at a telephoto end.

FIG. 7 is a sectional view of a zoom lens system according to a third exemplary embodiment at a wide-angle end. FIGS. 8 and 9 are diagrams showing aberrations of the zoom lens system according to the third exemplary embodiment at the wide-angle end and at a telephoto end, respectively.

The zoom lens system according to the third exemplary embodiment includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power.

During zooming from the wide-angle end to the telephoto end, the first lens unit L1 moves toward the object side along a locus convex toward the image side. Alternatively, the first lens unit L1 may monotonically move toward the object side. The second lens unit L2 moves along a locus convex toward the image side. The third and fourth lens units L3 and L4 move toward the object side. The fifth lens unit L5 moves along a locus convex toward the object side. The fifth lens unit L5 is responsible for focusing performed when the image taking distance changes.

At the telephoto end, to focus on a near object from focusing on an object at infinity, the fifth lens unit L5 is moved toward the object side as indicated by an arrow 5c shown in the corresponding sectional view.

A solid curve 5a and a dotted curve 5b shown for the fifth lens unit L5 are loci along which the fifth lens unit L5 moves to correct variations in the image plane occurring when magnification is changed from the wide-angle end to the telephoto end. The solid curve 5a indicates the case where the focus is on an object at infinity, and the dotted curve 5b indicates the case where the focus is on a near object.

The first lens unit L1 is a cemented lens in which, in order from the object side to the image side, a negative lens element, an optical element, and a positive lens element are cemented together. Thus, a compact configuration is realized. The positive lens element is made of a material (s-lal18 manufactured by OHARA) having a high refractive index of Nd=1.729 so that aberrations such as coma and field curvature occurring in the positive lens element are reduced. Thus, an effect similar to that in the first exemplary embodiment can be produced.

Fourth Exemplary Embodiment

Figure 10:
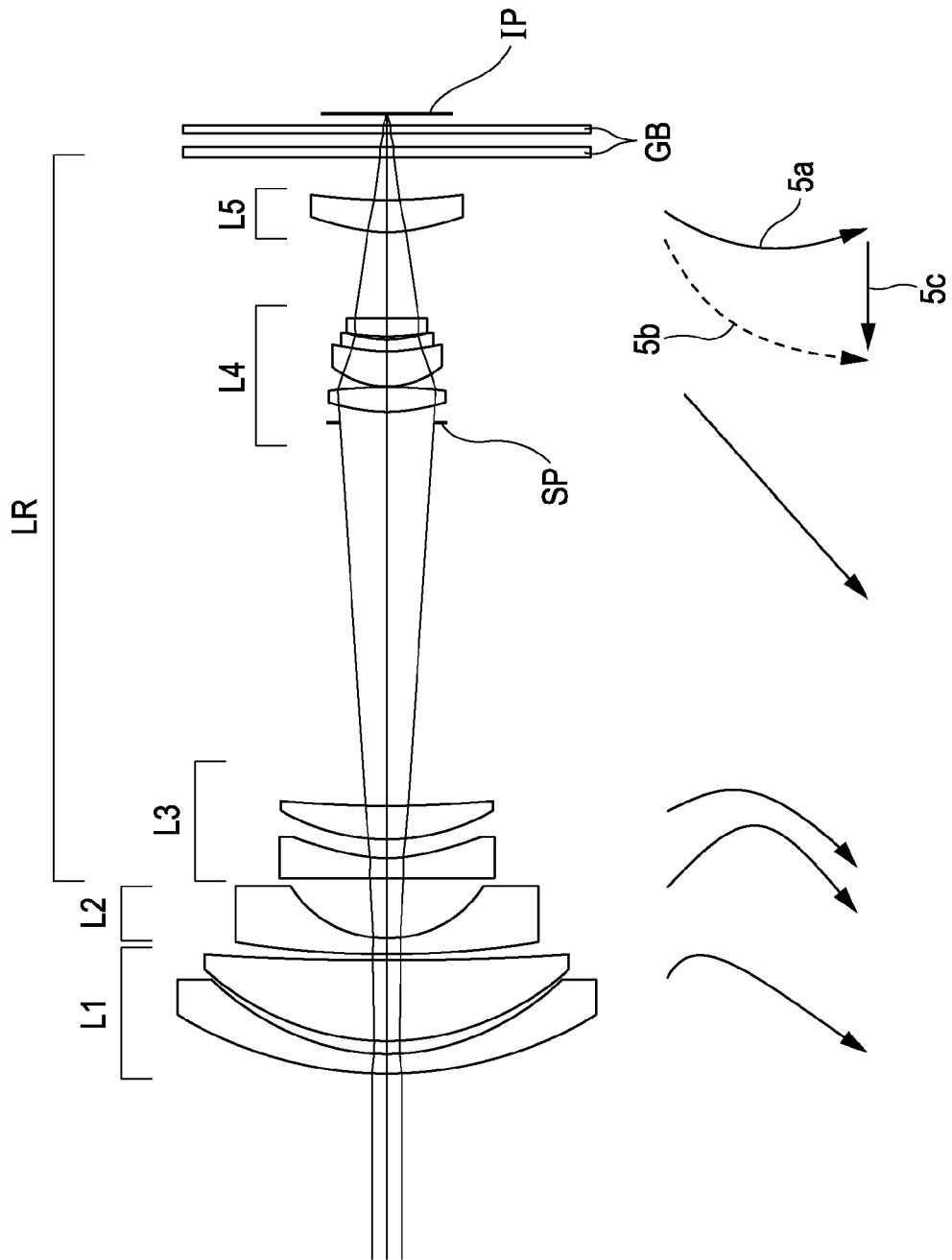
FIG. 10 is a sectional view of an example zoom lens system according to a fourth exemplary embodiment of the present invention.
Figure 11:
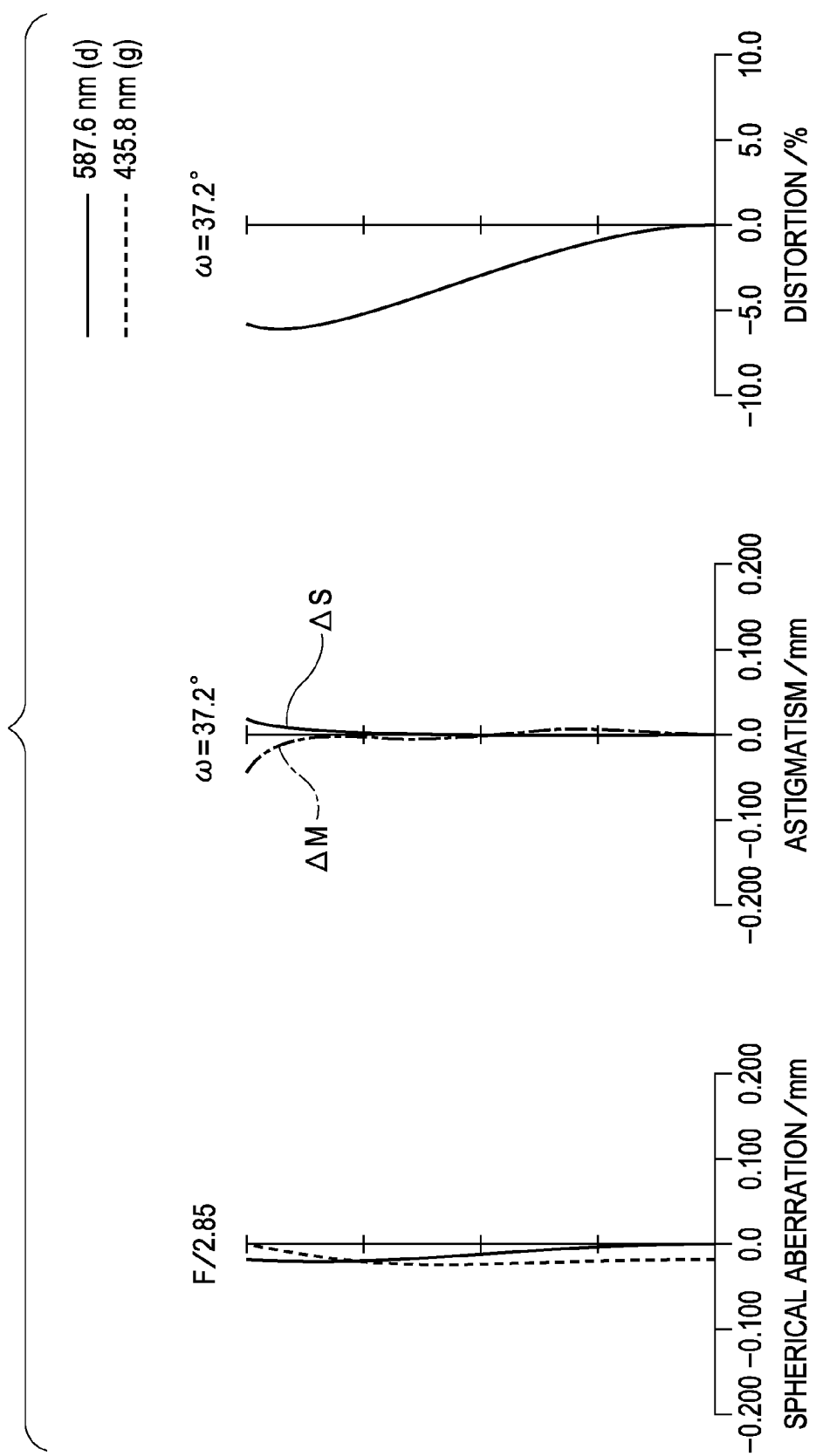
FIG. 11 is a diagram showing aberrations of the zoom lens system according to the fourth exemplary embodiment at a wide-angle end.
Figure 12:
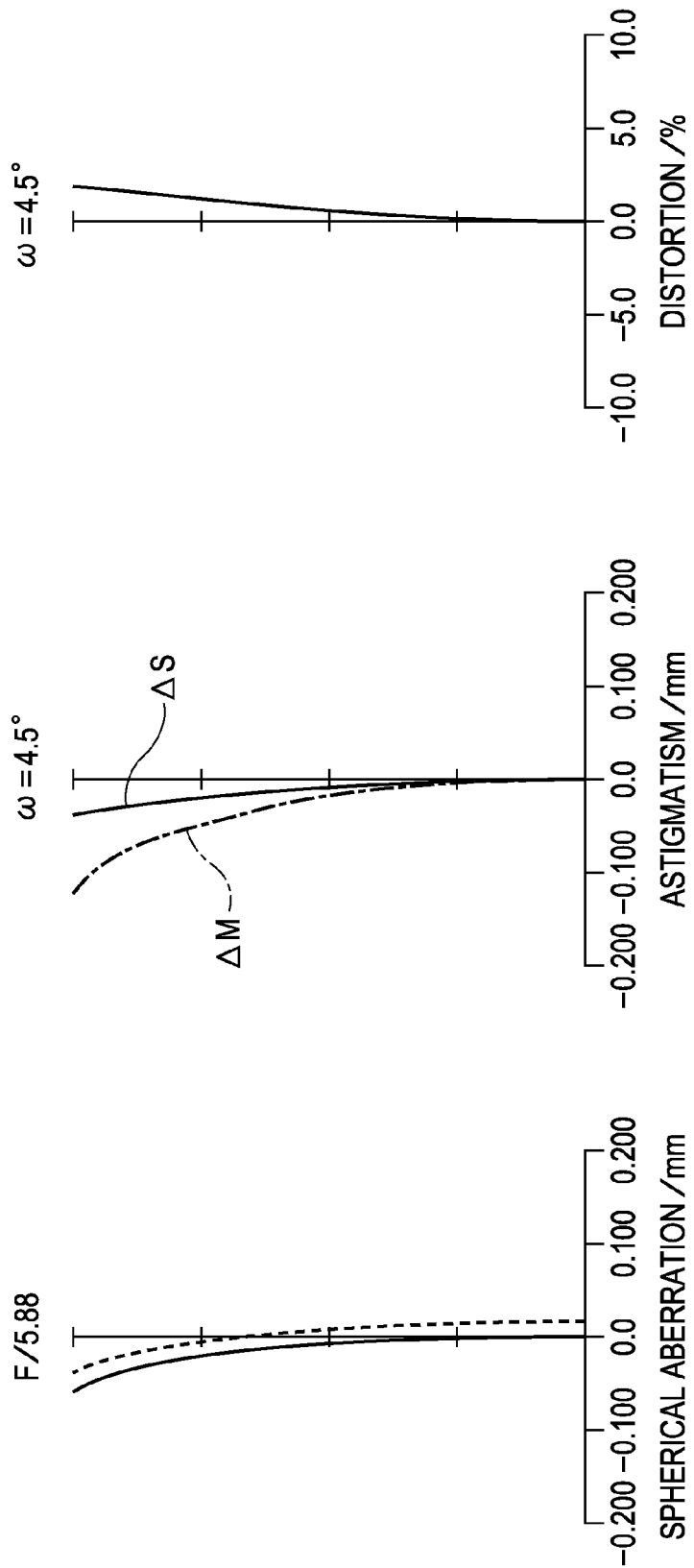
FIG. 12 is a diagram showing aberrations of the zoom lens system according to the fourth exemplary embodiment at a telephoto end.

FIG. 10 is a sectional view of a zoom lens system according to a fourth exemplary embodiment at a wide-angle end. FIGS. 11 and 12 are diagrams showing aberrations of the zoom lens system according to the fourth exemplary embodiment at the wide-angle end and at a telephoto end, respectively.

The zoom lens system according to the fourth exemplary embodiment includes, in order from the object side to the image side, a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power.

During zooming from the wide-angle end to the telephoto end, the first lens unit L1 moves toward the object side along a locus convex toward the image side.

Alternatively, the first lens unit L1 may monotonically move toward the object side. The second and third lens units L2 and L3 move along a locus convex toward the image side. The fourth lens unit L4 moves toward the object side. The fifth lens unit L5 moves along a locus convex toward the object side.

The fifth lens unit L5 is responsible for focusing performed when the image taking distance changes.

The way in which the fifth lens unit L5 moves during focusing is the same as in the third exemplary embodiment.

The first lens unit L1 is a cemented lens in which, in order from the object side to the image side, a negative lens element, an optical element, and a positive lens element are cemented together. Thus, a compact configuration is realized. The positive lens element is made of a material (s-lah66 manufactured by OHARA) having a high refractive index of Nd=1.773 so that aberrations such as coma and field curvature occurring in the positive lens element are reduced.

Thus, an effect similar to that in the first exemplary embodiment can be produced.

Fifth Exemplary Embodiment

Figure 13:
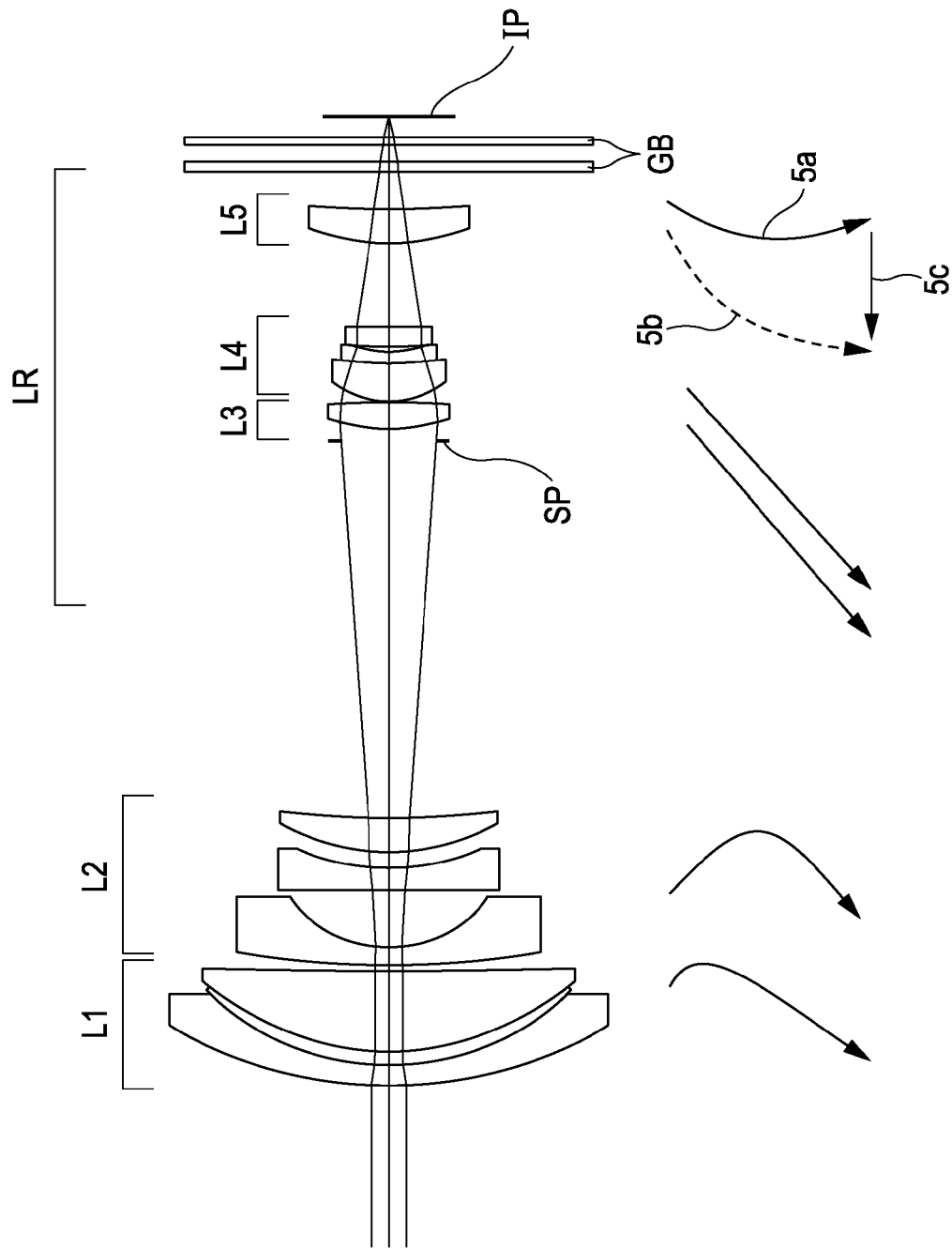
FIG. 13 is a sectional view of an example zoom lens system according to a fifth exemplary embodiment of the present invention.
Figure 14:
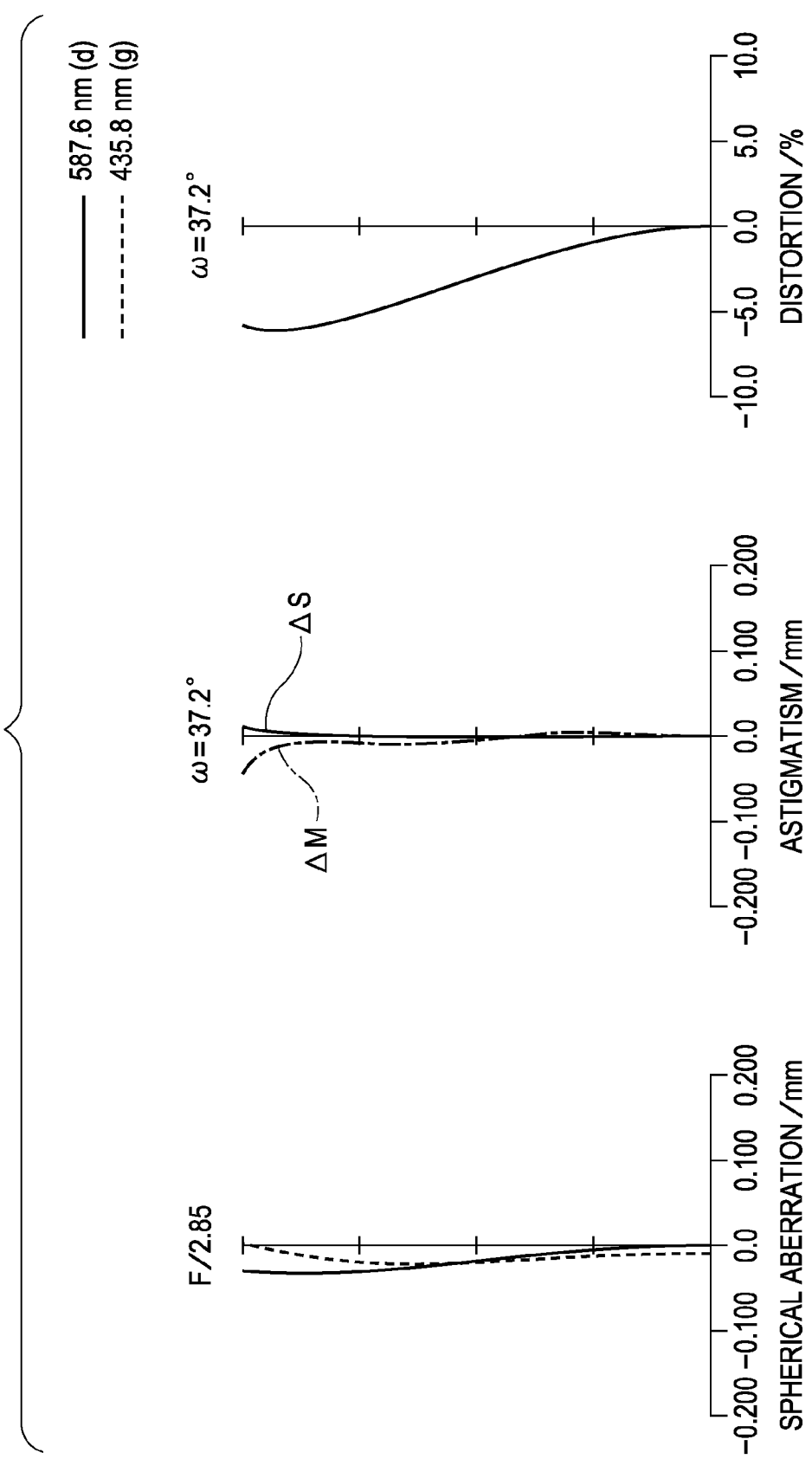
FIG. 14 is a diagram showing aberrations of the zoom lens system according to the fifth exemplary embodiment at a wide-angle end.
Figure 15:
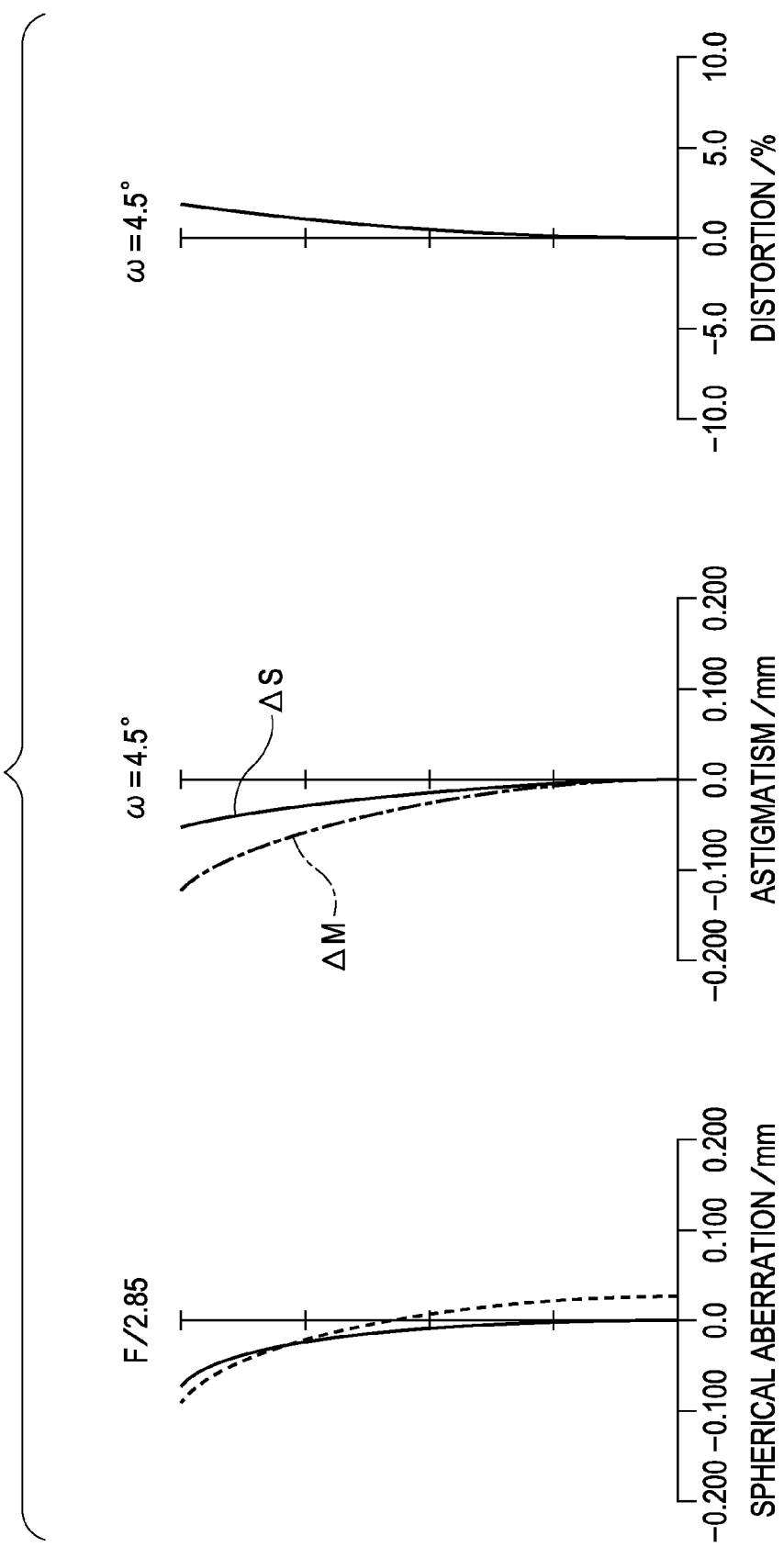
FIG. 15 is a diagram showing aberrations of the zoom lens system according to the fifth exemplary embodiment at a telephoto end.

FIG. 13 is a sectional view of a zoom lens system according to a fifth exemplary embodiment at a wide-angle end. FIGS. 14 and 15 are diagrams showing aberrations of the zoom lens system according to the fifth exemplary embodiment at the wide-angle end and at a telephoto end, respectively.

The zoom lens system according to the fifth exemplary embodiment includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power.

During zooming from the wide-angle end to the telephoto end, the first lens unit L1 moves toward the object side along a locus convex toward the image side. Alternatively, the first lens unit L1 may monotonically move toward the object side. The second lens unit L2 moves along a locus convex toward the image side.

The third and fourth lens units L3 and L4 move toward the object side. The fifth lens unit L5 moves along a locus convex toward the object side. The fifth lens unit L5 is responsible for focusing performed when the image taking distance changes.

The way in which the fifth lens unit L5 moves during focusing is the same as in the third exemplary embodiment. The first lens unit L1 is a cemented lens in which, in order from the object side to the image side, a negative lens element, an optical element, and a positive lens element are cemented together. Thus, a compact configuration is realized. The positive lens element is made of a material (s-lah66 manufactured by OHARA) having a high refractive index of Nd=1.773 so that aberrations such as coma and field curvature occurring in the positive lens element are reduced.

Thus, an effect similar to that in the first exemplary embodiment can be produced.

In each of the first to fifth exemplary embodiments, all of the lens units are moved during zooming from the wide-angle end to the telephoto end, whereby a high zoom ratio ranging from 7 to 10 is realized.

The optical element can be manufactured easily if it is made of resin. Of course, the optical element may be made of glass.

It is desirable that at least one surface of the optical element be of an aspherical shape. This facilitates enhancement of correctability of various aberrations such as coma and field curvature.

EXAMPLES 1-5

Numerical Examples 1 to 5 corresponding to the first to fifth exemplary embodiments will be given below.

In each Numerical Example, i denotes the order of the lens surface counted from the object side, Ri denotes the radius of curvature of the lens surface, Di denotes the lens thickness and the air gap between the i-th surface and the (i+1)-th surface, Ni denotes the refractive index for the d-line, νi denotes the Abbe number, and θgf denotes the partial dispersion ratio.

The four surfaces nearest to the image side correspond to the optical block GB or a color composition prism, for example.

The focal length, the f-number, and the half angle of view are denoted as f, FNO, and ω, respectively.

Aspherical coefficients are denoted as k, A, B, C, D, and E.

When the displacement from the surface vertex in the optical-axis direction at a height h from the optical axis is denoted as x, the shape of an aspherical surface is expressed as follows:

$$x=(h2/R)/[1+\{1-(1+k)(h/R)2\}1/2]+Ah4+Bh6+Ch8+Dh10+Eh12$$

where R denotes the radius of curvature.

The relationships between Conditional Expressions (1) to (9) provided above and values in Numerical Examples 1 to 5 are summarized in Table 1.

NUMERICAL EXAMPLE 1

| | f: 4.8~46.0 mm FNO: 2.85~5.87 ω: 37.21~4.52° | | | | |
|---|---|---|---|---|---|
| | R | D | N | ν | θgF |
| 1 | 24.037 | 1.20 | 1.847 | 23.8 | |
| 2 | 14.388 | 0.80 | 1.633 | 23.0 | 0.6747 |
| 3 | 15.748 | 4.60 | 1.772 | 49.6 | |
| 4 | 151.929 | (variable) | | | |
| 5 | 52.003 | 0.95 | 1.883 | 40.8 | |
| 6 | 6.627 | 3.28 | | | |
| 7 | (aspherical) | 1.35 | 1.860 | 40.3 | |
| 8 | 12.158 | 0.99 | | | |
| 9 | 12.279 | 1.91 | 1.923 | 18.9 | |
| 10 | 49.360 | (variable) | | | |
| 11 | (aspherical) | 1.50 | 1.678 | 55.3 | |
| 12 | −80.221 | 0.10 | | | |
| 13 | 4.838 | 2.19 | 1.487 | 70.2 | |
| 14 | 12.070 | 0.60 | 2.003 | 28.3 | |
| 15 | 4.221 | 0.40 | | | |
| 16 | 16.466 | 1.18 | 1.487 | 70.2 | |
| 17 | −34.172 | (variable) | | | |
| 18 | (aspherical) | 2.00 | 1.487 | 70.2 | |
| 19 | 36.606 | (variable) | | | |
| 20 | inf. | 0.60 | 1.516 | 64.1 | |

-continued

| f: 4.8~46.0 mm FNO: 2.85~5.87 ω: 37.21~4.52° | | | | |
|---|---|---|---|---|
| 21 | inf. | 0.90 | | |
| 22 | inf. | 0.40 | 1.516 | 64.1 |
| 23 | inf. | | | |

Interval data

| | W | T |
|---|---|---|
| d4 | 0.40 | 17.57 |
| d10 | 21.91 | 2.41 |
| d17 | 4.96 | 22.39 |
| d19 | 1.98 | 1.26 |

Aspherical shape data

| 7 | 1/r = −5.191e−003 | k = −6.325e+002 | A = 1.424e−005 | B = 2.903e−006 |
|---|---|---|---|---|
|  | C = −8.749e−008 | D = 1.624e−009 | E = 0.000e+000 | |
| 11 | 1/r = 1.068e−001 | k = 1.608e+000 | A = −3.950e−004 | B = −6.682e−006 |
|  | C = −1.364e−007 | D = 0.000e+000 | E = 0.000e+000 | |
| 18 | 1/r = 9.179e−002 | k = −5.182e−002 | A = −1.210e−005 | B = 1.989e−006 |
|  | C = −8.621e−008 | D = 3.989e−009 | E = 0.000e+000 | |

NUMERICAL EXAMPLE 2

| f: 4.7~31.6 mm FNO: 2.88~5.67 ω: 37.17~6.44° | | | | | |
|---|---|---|---|---|---|
| | R | D | N | ν | θgF |
| 1 | (aspherical) | 0.50 | 1.633 | 23.0 | 0.6747 |
| 2 | 26.434 | 4.67 | 1.678 | 55.3 | |
| 3 | −79.835 | 1.00 | 1.847 | 23.8 | |
| 4 | 332.271 | (variable) | | | |
| 5 | 44.219 | 1.00 | 1.772 | 49.6 | |
| 6 | 6.788 | 2.87 | | | |
| 7 | (aspherical) | 1.40 | 1.860 | 40.3 | |
| 8 | 9.980 | 1.38 | | | |
| 9 | 11.273 | 1.81 | 1.923 | 18.9 | |
| 10 | 30.555 | (variable) | | | |
| 11 | (aspherical) | 1.50 | 1.589 | 61.1 | |
| 12 | −24.353 | 0.10 | | | |
| 13 | 4.734 | 1.90 | 1.589 | 61.1 | |
| 14 | 13.243 | 0.60 | 2.003 | 28.3 | |
| 15 | 4.119 | 0.71 | | | |
| 16 | −65.346 | 1.15 | 1.487 | 70.2 | |
| 17 | −13.219 | (variable) | | | |
| 18 | 11.706 | 2.36 | 1.516 | 64.1 | |
| 19 | −718.292 | (variable) | | | |
| 20 | inf. | 0.60 | 1.516 | 64.1 | |
| 21 | inf. | 0.90 | | | |
| 22 | inf. | 0.40 | 1.516 | 64.1 | |
| 23 | inf. | | | | |

Interval data

| | W | T |
|---|---|---|
| d4 | 0.48 | 12.66 |
| d10 | 19.50 | 2.41 |
| d17 | 4.44 | 24.55 |
| d19 | 1.90 | 3.23 |

Aspherical shape data

| 1 | 1/r = 4.027e−002 | k = 9.435e−002 | A = 1.108e−006 | B = −3.584e−009 |
|---|---|---|---|---|
|  | C = 1.443e−011 | D = 0.000e+000 | E = 0.000e+000 | |
| 7 | 1/r = −5.116e−004 | k = −4.516e+003 | A = 3.298e−005 | B = −1.249e−007 |
|  | C = 3.967e−009 | D = 0.000e+000 | E = 0.000e+000 | |
| 11 | 1/r = 1.046e−001 | k = 1.233e+000 | A = −4.468e−004 | B = −3.690e−006 |
|  | C = −1.436e−007 | D = 0.000e+000 | E = 0.000e+000 | |

NUMERICAL EXAMPLE 3

| | f: 4.8~46.1 mm FNO: 2.85~5.88 ω: 37.19~4.52° | | | | |
|---|---|---|---|---|---|
| | R | D | N | ν | θgF |
| 1 | 23.426 | 1.20 | 1.847 | 23.8 | |
| 2 | 14.630 | 0.93 | 1.633 | 23.0 | 0.6747 |
| 3 | 16.434 | 4.58 | 1.729 | 54.7 | |
| 4 | 181.281 | (variable) | | | |
| 5 | 60.813 | 0.95 | 1.883 | 40.8 | |
| 6 | 6.939 | 3.26 | | | |
| 7 | (aspherical) | 1.35 | 1.860 | 40.3 | |
| 8 | 11.669 | 1.04 | | | |
| 9 | 12.302 | 1.98 | 1.923 | 18.9 | |
| 10 | 49.156 | (variable) | | | |
| 11 | (aspherical) | 1.50 | 1.678 | 55.3 | |
| 12 | −72.650 | 0.10 | | | |
| 13 | 4.691 | 2.22 | 1.487 | 70.2 | |
| 14 | 11.750 | 0.60 | 2.003 | 28.3 | |
| 15 | 4.040 | (variable) | | | |
| 16 | 13.552 | 1.18 | 1.487 | 70.2 | |
| 17 | −78.895 | (variable) | | | |
| 18 | (aspherical) | 2.00 | 1.487 | 70.2 | |
| 19 | 34.837 | (variable) | | | |
| 20 | inf. | 0.60 | 1.516 | 64.1 | |
| 21 | inf. | 0.90 | | | |
| 22 | inf. | 0.40 | 1.516 | 64.1 | |
| 23 | inf. | | | | |

| Interval data | | |
|---|---|---|
| | W | T |
| d4 | 0.40 | 18.18 |
| d10 | 22.89 | 2.41 |
| d15 | 0.63 | 0.50 |
| d17 | 4.61 | 21.45 |
| d19 | 1.86 | 1.22 |

| Aspherical shape data | | | | |
|---|---|---|---|---|
| 7 | 1/r = −6.137e−005 | k = 7.235e+006 | A = 3.255e−005 | B = 2.423e−006 |
| | C = −5.992e−008 | D = 1.122e−009 | E = 0.000e+000 | |
| 11 | 1/r = 1.074e−001 | k = 1.606e+000 | A = −3.974e−004 | B = −6.626e−006 |
| | C = −1.609e−007 | D = 0.000e+000 | E = 0.000e+000 | |
| 18 | 1/r = 9.410e−002 | k = −2.296e−001 | A = −5.365e−005 | B = 9.557e−006 |
| | C = −5.699e−007 | D = 1.562e−008 | E = 0.000e+000 | |

NUMERICAL EXAMPLE 4

| | f: 4.8~46.0 mm FNO: 2.85~5.88 ω: 37.20~4.52° | | | | |
|---|---|---|---|---|---|
| | R | D | N | ν | θgF |
| 1 | 24.802 | 1.20 | 1.847 | 23.8 | |
| 2 | 14.899 | 0.80 | 1.633 | 23.0 | 0.6747 |
| 3 | 16.223 | 4.86 | 1.772 | 49.6 | |
| 4 | 157.596 | (variable) | | | |
| 5 | 58.913 | 0.95 | 1.883 | 40.8 | |
| 6 | 7.032 | (variable) | | | |
| 7 | (aspherical) | 1.35 | 1.860 | 40.3 | |
| 8 | 12.927 | 1.07 | | | |
| 9 | 13.219 | 1.98 | 1.923 | 18.9 | |
| 10 | 57.024 | (variable) | | | |
| 11 | (aspherical) | 1.50 | 1.678 | 55.3 | |
| 12 | −88.003 | 0.10 | | | |
| 13 | 4.726 | 2.14 | 1.487 | 70.2 | |
| 14 | 11.138 | 0.60 | 2.003 | 28.3 | |
| 15 | 4.070 | 0.39 | | | |
| 16 | 13.841 | 1.16 | 1.487 | 70.2 | |

-continued

| | f: 4.8~46.0 mm FNO: 2.85~5.88 ω: 37.20~4.52° | | | |
|---|---|---|---|---|
| 17 | −118.206 | (variable) | | |
| 18 | (aspherical) | 1.99 | 1.487 | 70.2 |
| 19 | 35.723 | (variable) | | |
| 20 | inf. | 0.60 | 1.516 | 64.1 |
| 21 | inf. | 0.90 | | |
| 22 | inf. | 0.40 | 1.516 | 64.1 |
| 23 | inf. | | | |

Interval data

| | W | T |
|---|---|---|
| d4 | 0.40 | 17.71 |
| d6 | 3.69 | 3.30 |
| d10 | 23.95 | 2.41 |
| d17 | 5.17 | 21.91 |
| d19 | 2.57 | 2.07 |

Aspherical shape data

| 7 | $1/r = -4.461e-003$ | $k = -9.100e+001$ | $A = 2.848e-005$ | $B = 2.065e-006$ |
| | $C = -5.264e-008$ | $D = 9.579e-010$ | $E = 0.000e+000$ | |
| 11 | $1/r = 1.086e-001$ | $k = 1.595e+000$ | $A = -4.020e-004$ | $B = -6.543e-006$ |
| | $C = -1.853e-007$ | $D = 0.000e+000$ | $E = 0.000e+000$ | |
| 18 | $1/r = 9.257e-002$ | $k = -1.937e-001$ | $A = -5.763e-005$ | $B = 9.487e-006$ |
| | $C = -5.879e-007$ | $D = 1.644e-008$ | $E = 0.000e+000$ | |

NUMERICAL EXAMPLE 5

| | f: 4.8~46.0 mm FNO: 2.85~5.88 ω: 37.24~4.53° | | | | |
|---|---|---|---|---|---|
| | R | D | N | ν | θgF |
| 1 | 24.978 | 1.20 | 1.847 | 23.8 | |
| 2 | 14.735 | 0.80 | 1.633 | 23.0 | 0.6747 |
| 3 | 16.100 | 4.51 | 1.772 | 49.6 | |
| 4 | 192.890 | (variable) | | | |
| 5 | 58.245 | 0.95 | 1.883 | 40.8 | |
| 6 | 6.741 | 3.23 | | | |
| 7 | (aspherical) | 1.35 | 1.860 | 40.3 | |
| 8 | 12.220 | 0.95 | | | |
| 9 | 12.397 | 1.93 | 1.923 | 18.9 | |
| 10 | 52.971 | (variable) | | | |
| 11 | (aspherical) | 1.50 | 1.678 | 55.3 | |
| 12 | −79.965 | (variable) | | | |
| 13 | 4.796 | 2.20 | 1.487 | 70.2 | |
| 14 | 12.144 | 0.60 | 2.003 | 28.3 | |
| 15 | 4.165 | 0.39 | | | |
| 16 | 14.735 | 1.29 | 1.487 | 70.2 | |
| 17 | −41.494 | (variable) | | | |
| 18 | (aspherical) | 2.00 | 1.487 | 70.2 | |
| 19 | 52.914 | (variable) | | | |
| 20 | inf. | 0.60 | 1.516 | 64.1 | |
| 21 | inf. | 0.90 | | | |
| 22 | inf. | 0.40 | 1.516 | 64.1 | |
| 23 | inf. | | | | |

Interval data

| | W | T |
|---|---|---|
| d4 | 0.40 | 17.83 |
| d10 | 22.17 | 2.41 |
| d12 | 0.10 | 0.39 |
| d17 | 4.89 | 21.89 |
| d19 | 1.95 | 1.25 |

-continued f: 4.8~46.0 mm FNO: 2.85~5.88 ω: 37.24~4.53°

Aspherical shape data

| 7 | 1/r = −4.898e−003 | k = −7.832e+002 | A = 1.098e−005 | B = 2.728e−006 |
|---|---|---|---|---|
| | C = −6.939e−008 | D = 1.186e−009 | E = 0.000e+000 | |
| 11 | 1/r = 1.069e−001 | k = 1.620e+000 | A = −3.913e−004 | B = −6.672e−006 |
| | C = −1.528e−007 | D = 0.000e+000 | E = 0.000e+000 | |
| 18 | 1/r = 8.492e−002 | k = −1.858e−002 | A = −1.255e−005 | B = 3.766e−006 |
| | C = −1.908e−007 | D = 6.398e−009 | E = 0.000e+000 | |

TABLE 1

| | Numerical Example 1 | Numerical Example 2 | Numerical Example 3 | Numerical Example 4 | Numerical Example 5 |
|---|---|---|---|---|---|
| Expression (1) | 0.78 | 0.78 | 0.78 | 0.78 | 0.78 |
| Expression (2) | 0.038 | 0.024 | 0.036 | 0.037 | 0.038 |
| Expression (3) | 3.56 | 3.90 | 3.35 | 3.28 | 3.28 |
| Expression (4) | 0.07 | 0.02 | 0.08 | 0.06 | 0.07 |
| Expression (5) | 1.77 | 1.68 | 1.73 | 1.77 | 1.77 |
| Expression (6) | 0.96 | 1.11 | 1.56 | 1.59 | 0.88 |
| Expression (7) | 0.90 | 0.57 | 0.85 | 0.89 | 0.91 |
| Expression (8) | 3.98 | −0.61 | 4.33 | 4.01 | 3.88 |
| Expression (9) | 0.12 | 0.08 | 0.14 | 0.12 | 0.12 |

Sixth Exemplary Embodiment

Next, a digital still camera according to a sixth exemplary embodiment of the present invention will be described with reference to FIG. 16. The digital still camera includes the zoom lens system according to any of the first to fifth exemplary embodiments as an image taking optical system.

Figure 16:
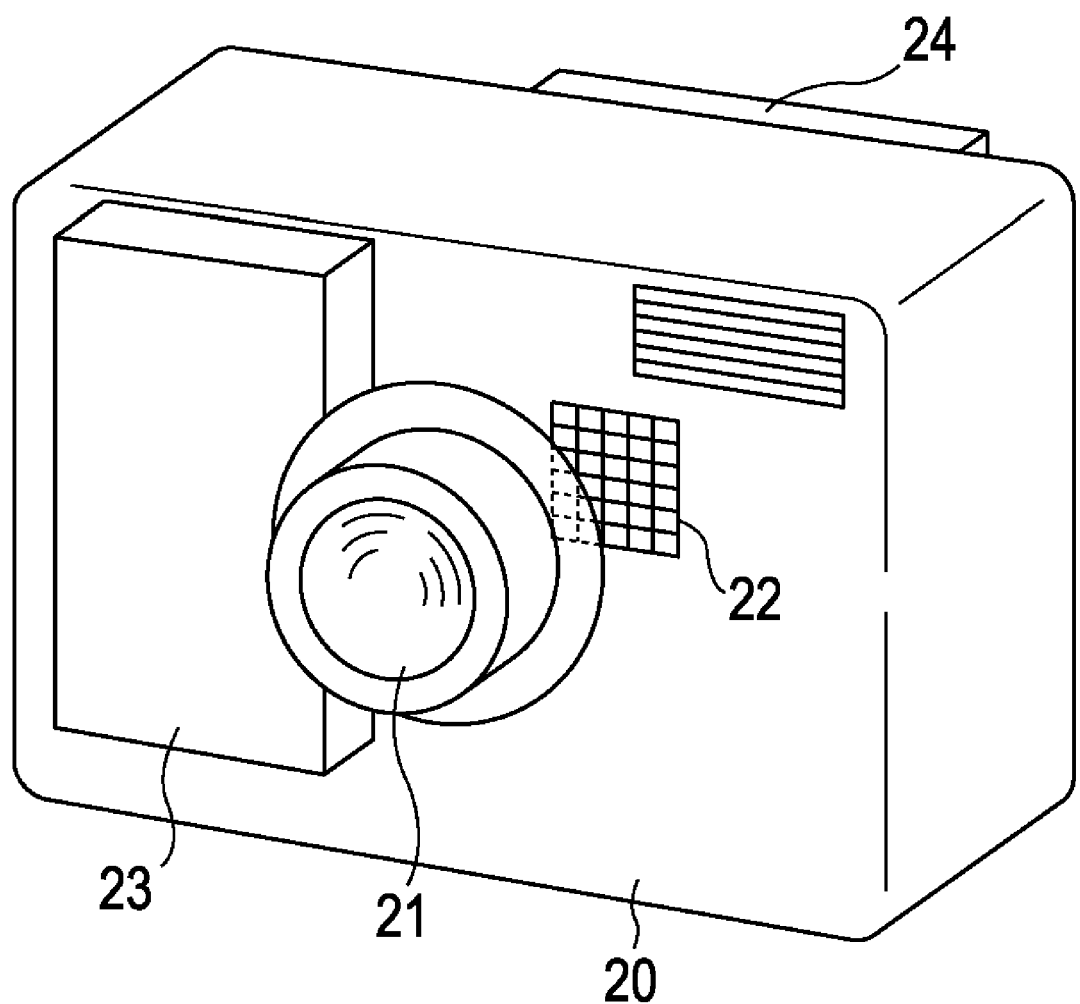
FIG. 16 schematically shows relevant parts of an example image pickup apparatus according to a sixth exemplary embodiment of the present invention.

FIG. 16 schematically shows relevant parts of a camera (an image pickup apparatus) that includes the zoom lens system according to any of the first to fifth exemplary embodiments of the present invention.

In FIG. 16, a camera body 20 is provided with an image taking optical system 21, which is the zoom lens system described in any of the first to fifth exemplary embodiments. The camera body 20 houses a solid-state image pickup device (photoelectric conversion element) 22, such as a CCD sensor or a CMOS sensor, that receives the light of an object image formed by the image taking optical system 21.

The camera body 20 is also provided with a memory 23 that stores information on the object image that has been subjected to photoelectric conversion performed by the solid-state image pickup device 22, and a viewfinder 24, which is a liquid crystal display panel, for example, through which the object image formed on the solid-state image pickup device 22 is observed.

By applying the zoom lens system according to any of the first to fifth exemplary embodiments of the present invention to an image pickup apparatus such as a digital still camera, a compact image pickup apparatus having high optical performance can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-230011 filed Sep. 5, 2007, which is hereby incorporated by reference herein in its entirety.

What is claimed is:

1. A zoom lens system, in order from an object side to an image side, comprising:

a first lens unit having a positive refractive power;
a second lens unit having a negative refractive power; and
a subsequent lens-unit set including at least one lens unit,
wherein intervals between the first lens unit, the second lens unit, and the lens units included in the subsequent lens-unit set change during zooming,
wherein the first lens unit includes a negative lens element, an optical element, and a positive lens element, and
wherein the following conditional expressions are satisfied, $$0.755 < \theta gF - (-1.665 \times 10^{-7} \cdot vn^3 + 5.213 \times 10^{-5} \cdot vn^2 - 5.656 \times 10^{-3} \cdot vn) < 1.011$$

$$0.023 < |f_1/(f_{1n} \cdot v_{1n})| < 0.050$$

$$3.2 < \beta_{3it}/\beta_{3iw} < 6.0$$

where $vn$ and $\theta gF$ denote an Abbe number and a partial dispersion ratio, respectively, of a material composing the optical element; $f_{1n}$ and $v_{1n}$ denote a focal length of the negative lens element and an Abbe number of a material composing the negative lens element, respectively; $f_1$ denotes a focal length of the first lens unit; and $\beta_{3iw}$ and $\beta_{3it}$ denote lateral magnifications of the subsequent lens-unit set at a wide-angle end and at a telephoto end, respectively.

2. The zoom lens system according to claim 1, wherein the following conditional expression is satisfied:

$$0.01 < \sqrt{(f_w \cdot f_t)}/f_N < 0.12$$

where $f_N$ denotes a focal length of the optical element, and $f_w$ and $f_t$ denote focal lengths of the zoom lens system at the wide-angle end and at the telephoto end, respectively.

3. The zoom lens system according to claim 1, wherein the following conditional expression is satisfied:

$$1.65 < N_{1p} < 1.90$$

where $N_{1p}$ denotes a refractive index of a material composing the positive lens element included in the first lens unit.

4. The zoom lens system according to claim 1, wherein, when the following is provided:

$$f_{3i} = \sqrt{(f_{3iw} \cdot f_{3it})}$$

the following conditional expression is satisfied:

$$0.6 < \sqrt{(f_w \cdot f_t)}/f_{3i} < 2.0$$

where $f_{3iw}$ and $f_{3it}$ denote focal lengths of the subsequent lens-unit set at the wide-angle end and at the telephoto end, respectively; and $f_w$ and $f_t$ denote focal lengths of the zoom lens system at the wide-angle end and at the telephoto end, respectively.

5. The zoom lens system according to claim 1, wherein the following conditional expression is satisfied:

$$0.5<|f_1/f_{1n}|<1.0$$

where $f_1$ denotes the focal length of the first lens unit, and $f_{1n}$ denotes the focal length of the negative lens element included in the first lens unit.

6. The zoom lens system according to claim 1, wherein the following conditional expression is satisfied:

$$-1<(r_1+r_2)/(r_1-r_2)<7$$

where $r_1$ and $r_2$ denote radii of curvature of an object-side surface and an image-side surface, respectively, of the negative lens element included in the first lens unit.

7. The zoom lens system according to claim 1, wherein the following conditional expression is satisfied:

$$0.01<t/L<0.20$$

where t denotes a thickness of the optical element along the optical axis, and L denotes a length from a first lens surface to a final lens surface in the first lens unit.

8. The zoom lens system according to claim 1, wherein the subsequent lens-unit set includes, in order from the object side to the image side, a third lens unit having a positive refractive power and a fourth lens unit having a positive refractive power.

9. The zoom lens system according to claim 1, wherein the subsequent lens-unit set includes, in order from the object side to the image side, a third lens unit having a positive refractive power, a fourth lens unit having a positive refractive power, and a fifth lens unit having a positive refractive power.

10. The zoom lens system according to claim 1, wherein the subsequent lens-unit set includes, in order from the object side to the image side, a third lens unit having a negative refractive power, a fourth lens unit having a positive refractive power, and a fifth lens unit having a positive refractive power.

11. The zoom lens system according to claim 1, wherein the subsequent lens-unit set includes, in order from the object side to the image side, a third lens unit having a positive refractive power, a fourth lens unit having a negative refractive power, and a fifth lens unit having a positive refractive power.

12. The zoom lens system according to claim 1, wherein the zoom lens system forms an image on a photoelectric conversion element.

13. An image pickup apparatus comprising:
    a zoom lens system, in order from an object side to an image side, including,
        a first lens unit having a positive refractive power;
        a second lens unit having a negative refractive power; and
        a subsequent lens-unit set including at least one lens unit,
    wherein intervals between the first lens unit, the second lens unit, and the lens units included in the subsequent lens-unit set change during zooming,
    wherein the first lens unit includes a negative lens element, an optical element, and a positive lens element, and
    wherein the following conditional expressions are satisfied, $$0.755<\theta gF-(-1.665\times10^{-7}\cdot vn^3+5.213\times10^{-5}\cdot vn^2-5.656\times10^{-3}\cdot vn)<1.011$$

$$0.023<|f_1/(f_{1n}\cdot v_{1n})|<0.050$$

$$3.2<\beta_{3it}/\beta_{3iw}<6.0$$

where vn and $\theta gF$ denote an Abbe number and a partial dispersion ratio, respectively, of a material composing the optical element; $f_{1n}$ and $v_{1n}$ denote a focal length of the negative lens element and an Abbe number of a material composing the negative lens element, respectively; $f_1$ denotes a focal length of the first lens unit; and $\beta_{3iw}$ and $\beta_{3it}$ denote lateral magnifications of the subsequent lens-unit set at a wide-angle end and at a telephoto end, respectively; and
a photoelectric conversion element configured to receive light of the image formed by the zoom lens system.

* * * * *